(12) United States Patent
Wilber

(10) Patent No.: US 7,096,242 B2
(45) Date of Patent: Aug. 22, 2006

(54) RANDOM NUMBER GENERATOR AND GENERATION METHOD

(76) Inventor: Scott A. Wilber, P.O. Box 523, Boulder, CO (US) 80306-0523

(\*) Notice: Subject to any disclaimer, the term of this patent is extended or adjusted under 35 U.S.C. 154(b) by 728 days.

(21) Appl. No.: 10/173,520

(22) Filed: Jun. 17, 2002

(65) Prior Publication Data

US 2002/0169810 A1    Nov. 14, 2002

Related U.S. Application Data

(62) Division of application No. 09/699,523, filed on Oct. 30, 2000, now Pat. No. 6,763,364, which is a division of application No. 08/388,631, filed on Feb. 14, 1995, now Pat. No. 6,324,558.

(51) Int. Cl.
*G06F 7/58* (2006.01)
(52) U.S. Cl. .................................... 708/255
(58) Field of Classification Search .................. 708/255
See application file for complete search history.

(56) References Cited

U.S. PATENT DOCUMENTS

| | | | |
|---|---|---|---|
| 3,423,683 A | 1/1969 | Kelsey et al. | 328/61 |
| 3,445,591 A | 5/1969 | Koehler et al. | 178/22 |
| 3,582,882 A | 6/1971 | Titcomb et al. | 340/146.2 |
| 3,612,845 A | 10/1971 | Lawlor | 235/156 |
| 3,614,399 A | 10/1971 | Linz | 235/152 |
| 3,706,941 A | 12/1972 | Cohn | 331/78 |
| 3,725,677 A | 4/1973 | Lawlor | 307/260 |
| 3,758,873 A | 9/1973 | Miller | 331/78 |
| 3,866,029 A | 2/1975 | Chevalier | 235/152 |
| 3,866,128 A | 2/1975 | Fletcher et al. | 328/59 |
| 4,176,399 A | 11/1979 | Hoffmann et al. | 364/717 |
| 4,183,088 A | 1/1980 | Simmons | 364/717 |
| 4,247,946 A | 1/1981 | Mawhinney | 455/1 |
| 4,355,366 A | 10/1982 | Porter | 364/717 |
| 4,395,703 A | 7/1983 | Piosenka | 340/347 |
| 4,433,413 A | 2/1984 | Fasang | |
| 4,499,551 A | 2/1985 | Frank | 364/717 |
| 4,513,386 A | 4/1985 | Glazer | 364/717 |
| 4,527,798 A | 7/1985 | Siekierski et al. | 273/86 |

(Continued)

OTHER PUBLICATIONS

Isida et al.; Random Number Generator; Nov. 6, 1956; Proceedings of the Institute of Statistical Mathematics; pp. 119-126.

(Continued)

*Primary Examiner*—Tan V. Mai
(74) *Attorney, Agent, or Firm*—Thomas Swenson; Carl A. Forest

(57) ABSTRACT

An RNG circuit is connected to the parallel port of a computer. The circuit includes a flat source of white noise and a CMOS amplifier circuit compensated in the high frequency range. A low-frequency cut-off is selected to maintain high band-width yet eliminate the 1/f amplifier noise tail. A CMOS comparator with a 10 nanosecond rise time converts the analog signal to a binary one. A shift register converts the serial signal to a 4-bit parallel one at a sample rate selected at the knee of the serial dependence curve. Two levels of XOR defect correction produce a BRS at 20 kHZ, which is converted to a 4-bit parallel word, latched and buffered. The entire circuit is powered from the data pins of the parallel port. A device driver interface in the computer operates the RNG. The randomness defects with various levels of correction and sample rates are calculated and the RNG is optimized before manufacture.

25 Claims, 14 Drawing Sheets

U.S. PATENT DOCUMENTS

| | | | |
|---|---|---|---|
| 4,545,024 A | 10/1985 | Maher et al. | 364/717 |
| 4,578,598 A | 3/1986 | Faulhaber | 307/271 |
| 4,611,183 A | 9/1986 | Piosenka et al. | 331/78 |
| 4,810,975 A | 3/1989 | Dias | |
| 4,811,247 A | 3/1989 | Malady et al. | 364/550 |
| 4,819,818 A | 4/1989 | Simkus et al. | |
| 4,853,884 A | 8/1989 | Brown et al. | 364/602 |
| 4,858,122 A | 8/1989 | Kreisner | 364/410 |
| 4,977,596 A | 12/1990 | Maestas et al. | 380/48 |
| 5,007,087 A | 4/1991 | Bernstein et al. | |
| 5,117,380 A | 5/1992 | Tanagawa | 364/717 |
| 5,193,198 A | 3/1993 | Yokouchi | |
| 5,214,396 A | 5/1993 | Cheon | 332/104 |
| 5,214,761 A | 5/1993 | Barrett et al. | 395/275 |
| 5,239,494 A | 8/1993 | Golbeck | 364/602 |
| 5,317,528 A | 5/1994 | Gofman | |
| 5,510,698 A | 4/1996 | Stankovic et al. | |
| 5,841,865 A * | 11/1998 | Sudia | 380/286 |

OTHER PUBLICATIONS

Schmidt; A Quantum Mechanical Random Number Generator for PSI Tests; The Journal of Parapsychology; circa 1972; pp. 219-224.

Izumi; Universal Random Signal Generator; Electrical Engineering in Japan; vol. 99, No. 4; Aug. 1979; pp. 124-130.

Park et al.; Random Number Generators: Good Ones Are Hard to Find; Computing Practices; Communications of the ACM; Oct. 1988; vol. 31, No. 10; pp. 1192-1201.

Macomber et al.; An n-Dimensional Uniform Random Number Generator Suitable for IBM-Compatible Microcomputers; Interfaces; vol. 20, No. 3; May-Jun. 1990 (pp. 49-59).

Agnew; Random Sources for Cryptographic Systems; Lecture Notes in Computer Science, Advances in Cryptology-EUROCRYPT '87; Springer-Verlag, Berlin; 1987; pp. 77-81.

Martino et al.; Optical Random Number Generator Based on Photoevent Locations; Applied Optics; vol. 30, No. 8; Mar. 10, 1991; pp. 981-989.

Schmidt; Quantum-Mechanical Random-Number Generator; Journal of Applied Physics; vol. 41, No. 2; Feb. 1970; pp. 462-468.

Sutcliffe; Noise-Spectrum Measurement at Subaudio Frequencies; Proceedings of the IEE; vol. 112, No. 2; Feb. 1965; pp. 301-309.

Niederreiter; Random Number Generation and Quasi-Monte Carlo Methods; Society For Industrial and Applied Mathematics; Philadelphia, PA; 1992; Chapter 7, pp. 161-164.

Compagner; Definitions of Randomness; American Journal of Physics; vol. 59 No. 8; Aug. 1991; pp. 700-705.

MacLaren et al.; Uniform Random Number Generators; Journal of the Association for Computing Machinery; vol. 12, No. 1; Jan. 1965; pp. 83-89.

Sutcliffe et al.; A Low-Frequency Gaussian White-Noise Generator; Int. J. Control; 1968; vol. 8, No. 5; pp. 457-471.

Al-Bayati et al.; Novel Design of a Simple and Accurate White Gaussian Noise Generator; Int. J. Electronics; 1991; vol. 70, No. 2; pp. 321-326.

Montes; A Definition of Randomness and a Model of a Nonlocal Real World; Physics Essays; vol. 5, No. 2; 1992; pp. 180-183.

André et al.; Figures of Merit For Digital Multistep Pseudorandom Numbers; Mathematics of Computation; vol. 54, No. 190; Apr. 1990; pp. 737-748.

Niederreiter; Pseudorandom Numbers and Quasirandom Points; Math. Mech.; vol. 73; 1993; pp. T648-T652.

Utts; Replication and Meta-Analysis in Parapsychology; Statistical Science; vol. 6, No. 4; 1991; pp. 363-403.

Havel; An Electronic Generator of Random Sequences; Czechoslovak Academy of Sciences; Institute of Information Theory and Automation; pp. 219-229.

Radin; Testing the Plausibility of PSI-Mediated Computer System Failures; Journal of Parapsychology; vol. 54; Mar. 1990; pp. 1-19.

Kafadar; Gaussian White-Noise Generation for Digital Signal Synthesis; IEEE Transactions on Instrumentation and Measurement; vol. IM-35, No. 4; Dec. 1986; pp. 492-495.

Mahmood; Gaussian Noise Generator with Specific Autocorrelation Properties; Int. J. Electronics; 1989; vol. 66, No. 5; pp. 725-731.

Izumi; Fast Generation of a White and Normal Random Signal; IEEE Transactions on Instrumentation and Measurement; vol. 37, No. 2; Jun. 1988; pp. 316-318.

Lawson (editor); Chapter 3—Theoretical Introduction; Threshold Signals; Office of Scientific Research and Development, National Defense Research Committee; 1950; pp. 33-97.

Rice; Mathematical Analysis of Random Noise; The Bell System Technical Journal; vol. 23; 1944; pp. 282-333.

Van Vleck et al.; The Spectrum of Clipped Noise; Proceedings of the IEEE; vol. 54, No. 1; Jan. 1966; pp. 2-19.

Sokal; Optimum Choice of Noise Frequency Band and Sampling Rate for Generating Random Binary Digits from Clipped White Noise; IEEE Transactions on Computers; Jun. 1972; pp. 614-615.

MS-DOS Encyclopedia; Article 15; Installable Device Drivers; Section II: Programming in the MS-DOS Environment; pp. 447-471.

MS-DOS Encyclopedia; Article 11; Terminate-and-Stay-Resident Utilties; Section II: Programming in the MS-DOS Environment; pp. 347-359; 1988.

* cited by examiner

RANDOM NUMBER GENERATOR AND GENERATION METHOD

RELATED APPLICATIONS

This application is a divisional application of application Ser. No. 09/699,523, Oct. 30, 2000, now U.S. Pat. No. 6,763,364 which is a divisional of application Ser. No. 08/388,631 filed Feb. 14, 1995, and issued Nov. 27, 2001 as U.S. Pat. No. 6,324,558.

BACKGROUND OF THE INVENTION

1. Field of the Invention

The invention in general relates to random number generators, and more particularly to a random number generator that generates true binary random sequences.

2. Description of the Related Art

It has become widely recognized that random number generators are fundamentally important in the computer age. See Stephen K. Park and Keith W. Miller, "Random Number Generators: Good Ones Are Hard To Find", in *Computing Practices*, October 1988, V. 31, No. 10, pp. 1192–1201. Random number generators may be divided into two types: true random number generators, which generate numbers from a non-deterministic source, and pseudorandom number generators, which generate numbers from a deterministic algorithm. A high quality random number generator is necessary for functions from Monte Carlo-based studies used in computer modeling of the global economy, to cryptography, to parapsychological studies, to marketing research, to lottery games. Thus, it is not surprising that the literature reveals hundreds of random number generators. See, for example, the following U.S. patents: U.S. Pat. No. 3,423,683 issued to E. S. Kelsey et al.; U.S. Pat. No. 3,445,591 issued to D. R. Koehler et al.; U.S. Pat. No. 3,612,845 issued to Reed C. Lawlor; U.S. Pat. No. 3,706,941 issued to Charles E. Cohn; U.S. Pat. No. 3,725,677 issued to Reed C. Lawlor; U.S. Pat. No. 3,758,873 issued to Herbert E. Miller; U.S. Pat. No. 4,183,088 issued to Robert E. Simmons; U.S. Pat. No. 4,395,703 issued to Gerald V. Piosenka; U.S. Pat. No. 4,513,386 issued to Sydney Glazer; U.S. Pat. No. 4,578,598 issued to Mark E. Faulaber; U.S. Pat. No. 4,858,122 issued to William Kreisner; and U.S. Pat. No. 5,239,494 issued to Edmund C. Golbeck; and the following papers: Masatugu Isida and Hiroji Ikeda, "Random Number Generator" in *Proceedings of the Institute of Statistical Mechanics*, 1956, pp. 119–126; Helmut Schmidt, "A Quantum Mechanical Random Number Generator for PSI Tests" in The Journal of Parapsychology, circa 1972, pp. 219–224; and Teruyuki Izimi, "Universal Random Signal Generator", in *Electrical Engineering in Japan*, Vol. 99, No. 4, 1979, pp. 124–130. Yet, there are few "random number generators" on the market today that actually produce random numbers. High quality true random number generators are still in the realm of large-budget projects at major research institutions.

A random number generator (RNG) that interfaces directly with a computer would be of particular value since random numbers are often used in conjunction with a computer, and a direct interface allows a researcher or other computer user to simply call up the number generator and use the numbers it produces within the context of their program. See for example, James H. Macomber and Charles S. White, "An n-Dimensional Uniform Random Number Generator Suitable for IBM-Compatible Microcomputers", in *Interfaces*, Vol. 20, No. 3, May–June 1990, pp. 49–59.

Because the most common computers today are digital, RNG's that interface with computers generally generate a binary random sequence (BRS) rather than a sequence of analog or floating point numbers, which BRS's may be used as generated, converted to uniform distributed numbers, converted to Gaussian distributed numbers or converted to any other type of distribution. Many computer programs that utilize random numbers are statistical in nature; that is, they depend on large numbers of events which are averaged in some manner to reach a valid conclusion. For this to be accomplished over reasonable time periods, these programs require that large quantities of binary bits or random numbers be generated in short periods. True random number generators usually trade off speed for randomness, thus are relatively slow. As a result, at this time it appears that the available random number generators that interface directly with computers are all software-based, pseudorandom number generators. See, Macomber and White, supra; Niederreiter, supra; and Park and Miller, supra.

While pseudorandom number generators are suitably fast for a computer, they cannot generate a true random number because they are generated by algorithms which are deterministic, i.e. they are totally predictable given knowledge of the algorithm used. In addition, most pseudorandom number generators used with computers produce number sequences which fail even moderately stringent statistical randomness tests. It is known that to generate a true random number, one must start with a non-deterministic signal, such as white noise generated by a resistor, diode, or other electronic device, the time between radioactive particle decay, the locations of detected photo-events, or other signal source that is essentially random because it is based on quantum mechanics or other statistically random process. See, for example, U.S. Pat. No. 4,176,399 issued to Jean-Claude Hoffmann et al., and the following papers: G. B. Agnew, "Random Sources For Cryptographic Systems", in Lecture Notes in *Computer Science-Advances in Cryptotogy-Eurocrypt '87*, Springer-Verlag, Berlin, 1987, pp. 77–81; and Anthony J. Martino and G. Michael Morris, "Optical Random Number Generator Based On Photoevent Locations", in *Applied Optics*, Vol. 30, No. 8, 10 March 1991, pp. 981–989. We have referred to these signals as "essentially" random, because even these non-deterministic sources exhibit some defects because they are generated with macroscopic, real world devices.

It is known that the randomness in such non-deterministic signals can be improved by digital processing. See for example, U.S. Pat. No. 4,545,024 issued to David P. Maher et al., and the paper: Helmut Schmidt, "Quantum-Mechanical Random-Number Generator", in *Journal of Applied Physics*, Vol. 41, No. 2, February 1970, pp. 462–468. In particular it is known to improve randomness by using EXCLUSIVE OR (XOR) gates to discard certain bits. See, U.S. Pat. No. 4,355,366 issued to Sigmund N. Porter. It is also known to use comparators or other electronic devices to convert analog noise signals to binary signals. See, U.S. Pat. No. 4,545,024 cited above and H. Sutcliffe, "Noise-spectrum Measurement at Subaudio Frequencies", in Proceedings of the IEEE, Vol. 112, No. 2, February 1965, pp. 301–309.

Despite the fact that all of the above has been known for many years, a practical, inexpensive, fast, high-quality true random number generator that interfaces directly with a computer is not presently available. In fact, some authorities maintain that such a device is not practically possible. See, Harald Niederreiter, *Random Number Generation and Quasi-Monte Carlo Methods*, Chapter 7, section 7.2, p. 164, Society For Industrial and Applied Mathematics, Philadelphia 1992; and Aaldert Compagner, "Definitions of Randomness", *American Journal of Physics*, Vol. 59, No. 8, August 1991, pp. 700–705, at page 702. As a result, "random number generators" used with computers today are pseudo-random number generators.

SUMMARY OF THE INVENTION

The present invention solves the above problems by providing a true random number generator (RNG) in which the defects in randomness in the sequence generated are so small that one would have to run a test for trillions of years to demonstrate the defects with 95% confidence level. The random number generator plugs into the parallel port of any personal computer and is directly accessed via device driver software installed in the computer. The RNG is as easy to use as a printer, modem, or any other peripheral and is fast, producing a binary random sequence (BRS) of up to 10,000 bits per second, or 20,000 bits per second if a number of defects that could be demonstrated in several years at 95% confidence level is acceptable. Moreover, the device is inexpensive, costing little more than a modem or word-processing software.

The random number generator according to the invention amplifies the analog signal from a non-deterministic signal generator, passes it through a comparator to create a binary signal, which is sampled and stored in a shift register to create a digital signal. The randomness is then improved by using two levels of EXCLUSIVE OR (XOR) correction gates.

The source of the non-deterministic signal is preferably the thermal noise of a resistor, which has an essentially flat average amplitude versus frequency spectrum. The amplifier that amplifies the signal is a low-noise amplifier, so that the amplifier noise, which is not flat, contributes one-third or less of the total noise, preferably 25% or less. Prior to passing through the comparator, the signal is processed in several novel ways to improve its ability to generate random numbers. As is common in the amplifier art, the 1/F low-frequency tail of the amplifier noise is cut off with a high pass filter. However, the cut-off is made at a relatively low 100 Hertz (Hz) to include as much of the white noise spectrum as possible. That is, since the optimum spectrum from which to generate a random number is a white noise spectrum containing all frequencies, utilizing a relatively low high-pass filter decreases the defects in the final random number sequence. Further, the high frequency fall off that is common to op amps due to gain-bandwidth product limitations, is compensated for. Starting with a low-noise amplifier and compensating for the high frequency fall off helps keep the signal coming into the comparator essentially flat, preferably within ±0.25 db, over a wide bandwidth, preferably about 100 Hz to 100 kiloHerz (KHz). The comparator itself is a very high speed comparator, which retains the bandwidth of the analog section. The comparator offset is adjusted, preferably using a selectable resistor, so that there is a nearly equal number of high and low bits generated by the comparator. Thus, the binary signal produced by the comparator is a stable, highly random signal.

The sampling frequency is selected to be the optimum frequency to produce a high frequency stream of highly random binary bits. The sampling period is preferably selected to be at the knee of the serial dependence versus delay time curve, sometimes called the auto-correlation function. In the preferred embodiment of the invention this is 12.5 microseconds, which results in a bit stream at a frequency of 80,000 bits per second. Two levels of correction with the XOR gates decreases the defects in randomness to the extremely low levels mentioned above, and reduces the frequency to the 20,000 bits per second mentioned above. A third level of XOR function may be accomplished by software in the computer, reducing the bit rate to 10,000 per second.

It has been discovered that the randomness of an RNG producing a binary random sequence according to the invention can be predicted by the equations:

$$B_2^* = -SD(1) \tag{1}$$

and $$SD(1)^* \leq SD(1)^2 + SD(2)^2,\ SD(2)^* \leq SD(1)^2 + SD(4)^2, \tag{2}$$

where SD(t) is the serial dependence as a function time, SD(1) indicates the first order serial dependence, that is the serial dependence at the first sample period, SD(2) second order serial dependence, etc., and $B_2$ is the fractional bias in the 1, 0 probability given by the equation:

$$B_2 = [N(1) - 0.5N]/0.5N \tag{3}$$

where N(1) is the number of 1's in a binary random sequence of length N. In equations (1) and (2) the star, *, indicates the statistic at the output of each level of XOR error correction while the unstarred values are those at the input of the error correction level. These equations were used to determine the number of levels of correction that were required to produce a stream of random numbers in which any lack of randomness could be detected given the measured amount of statistical defect at the XOR's input. Thus, the use of equations 1 through 3 permit the design of the RNG to be optimized: enough randomness defect correction can be applied to remove any possibility of detecting non-randomness, but not excessive correction that would slow the device and add to its manufacturing cost.

The 20 kHertz stream of random bits is preferably converted into a 4-bit word with a shift register, latched, then sent to a buffer which isolates the random number generator from cable transients. An interrupt is generated when a 4-bit number is ready. A device driver in the computer recognizes the interrupt, reads the number and stores it in a memory buffer for use on demand by the user.

The entire random number generator is preferably mounted on a single small printed circuit board (PCB) which is adapted to be connected to and powered by the conventional parallel port of any personal computer. The power is taken off selected pins, preferably the 8-bit date output, of the parallel port while the ground is connected to the parallel port ground pins. The device driver installed in the computer simply applies the appropriate high signals to the selected pins to power the RNG. A negative voltage for the analog noise generator circuit is provided by charge pumps. Special circuits protect the RNG if the wrong voltages are applied to critical pins.

The RNG is isolated from external sources of non-randomness. As indicated above, the output drivers of the RNG are isolated from the random number generator itself to prevent any loading or interference output on the lines from feeding back into the RNG. The analog noise generator, the comparator, and the digital portions of the circuit have separate power supplies. All power supplies are filtered to remove transients.

A low amplitude portion of the circuitry is isolated from the normal amplitude circuitry and shielded to protect it from any external EMI or ESI source. The shield preferably comprises a ground plane on the PCB surrounding the low amplitude circuit, except for a small channel through which traces to the digital circuit pass, and a metal enclosure that encloses both sides of the board and bolts to the PCB with a flange on the enclosure contacting the ground plane. The flange also eliminates the effect of fringing through the thickness of the circuit board.

The device driver in the computer finds and tests the installed RNG each time the computer is turned on.

The invention provides a random number generator comprising: a computer having a parallel port, the parallel port including data and control lines; a random number generator circuit for producing a random sequence of signals, the random number generator circuit including power supply means for powering the circuit from power supplied by one or more of the data and control lines of the parallel port; and electrical connecting means for transferring power from the computer to the power supply means via the parallel port and for communicated signals generated by the random number generator circuit to the computer through the parallel port. Preferably, the power supply means comprises a charge pump. Preferably, the computer includes device driver means for operating the random number generator circuit through the parallel port. Preferably, the random number generator circuit includes a source of true random signals, the source being selected from the group consisting of: a thermal noise source; and an intrinsically random quantum source.

In another aspect, the invention provides a random number generator system comprising: a computer including a power source producing a first voltage of one sign; a charge pump for producing a second voltage of the opposite sign to the first voltage; and a random number generator circuit powered by the first and second voltages for generating a random sequence of signals. Preferably, the first voltage is a positive voltage, the second voltage is a negative voltage, and the charge pump comprises an analog multiplexer circuit.

In a further aspect the invention provides a random number generator comprising a circuit for generating a sequence of binary signals, and a computer for receiving the binary signals and utilizing them, the circuit using 30 milliwatts of power or less. Preferably, the circuit comprises: an analog noise generator for producing an analog noise signal; and a comparator, responsive to the analog noise signal, for providing the sequence of binary signals, the comparator: having a rise time up to 25 nanoseconds, drawing less than three milliamps of current, and operating down to 2 volts.

In another aspect the invention provides a random number generator circuit comprising: an analog noise generator; a charge pump for providing a voltage to the analog noise generator; an analog to binary converter for converting the analog noise to a binary signal; a randomness defect reducer for reducing randomness defects in the binary signal; and a buffer for driving the signal to an electronic device external of the random number generator circuit. Preferably, each of the charge pump, the analog noise generator, the analog to binary converter, the randomness defect reducer, and the buffer include a separately filtered power supply. Preferably, each of the charge pump, the analog noise generator, the analog to binary converter, the randomness defect reducer, and the buffer comprise a CMOS integrated circuit.

In still a further aspect, the invention provides a random number circuit for producing a sequence of binary signals, the circuit comprising: a source of a white noise electrical signal; and amplifier means for amplifying the white noise signal while adding an amplifier noise signal to the white noise signal; and wherein the amplifier noise is one-third or less of the total noise signal comprising the white noise signal and the amplifier noise signal. Preferably, the circuit further includes high pass filter means for removing a low-frequency tail in the total noise signal, the high pass filter means having a cut-off frequency in the range from 36 Hertz to 170 Hertz. Preferably, the total noise signal has a bandwidth of from 100 Hz to 100 KHz and is flat within ±0.25 db over the bandwidth.

In yet a further aspect, the invention provides a random number generator circuit for proving a sequence of binary signals, the circuit comprising: an analog noise generator for producing an analog noise signal; and comparator means, responsive to the analog noise signal, for providing the sequence of binary signals, the comparator means comprising an XHCU04 hex inverter, where X is 54 or 74.

In still another aspect, the invention provides a random number generator circuit comprising: a source of a white noise electrical signal; and amplifier means for amplifying the white noise signal, the amplifier means comprising one or more operational amplifiers selected from the group consisting of: TL06X operational amplifiers, where X is 0, 1, 2, or 4, LF44Y operational amplifiers, where Y is 1, 2, or 4, and AD548 and AD648 single and dual operational amplifiers.

The invention also provides a random number generator circuit comprising: a low amplitude circuit portion; a normal amplitude circuit portion; and an EMI shield enclosing the low amplitude circuit portion, wherein the low amplitude circuit portion is mounted on a printed circuit board and the shield comprises: a ground plane on the circuit board located around the low amplitude circuit portion in the plane of the circuit board, a component side cover and a solder side cover, the covers electrically connected to the ground plane.

In addition, the invention provides a random number generator comprising: a random number generator circuit for generating a random sequence of signals; and a computer including a means for interfacing with the random number generator circuit, the means for interfacing consisting of one or more of the following: a device driver, a TSR, a portion of the operating system of the computer, and a program stored in the bios memory of the computer. Preferably, the means for interfacing comprises a device driver and includes means for testing the random number generator circuit. The random number generator circuit is preferably located in a module separate from the computer, on an add-on board for mounting in the computer, on the motherboard of the computer, or on a peripheral of the computer.

In a further aspect, the invention provides a device for interfacing with a random number generator, the device comprising: a computer including: memory means for storing information for interfacing with a random number generator circuit, and processing means communicating with the memory for interfacing with the random number generator; and wherein the information for interfacing with a random number generator consists of one or more of the following: a device driver, a TSR, a portion of the operating system of the computer, and a program stored in the bios memory of the computer.

The invention also provides a random number generator comprising: a circuit for producing a sequence of binary signals; and sample means for sampling the sequence of binary signals at a sampling rate between 50% and 125% of the sampling rate at the knee on the serial dependence versus delay time curve describing the circuit to provide a random sequence of signals at the sampling rate. Preferably, the sampling rate is at the knee of the serial dependence versus delay time curve. Preferably, the random number generator further includes randomness defect reducer means for reducing the randomness defects in the sequence of binary signals.

The invention also provides a method of generating a random sequence of signals, the method comprising the steps of: providing a circuit for producing a sequence of signals; and sampling the sequence of signals at a sampling rate between 50% and 125% of a sampling rate corresponding to the knee on the serial dependence versus delay time curve describing the circuit to provide a random sequence of signals at the sampling rate. Preferably, the step of sampling comprises measuring a statistical parameter as a function of a time parameter related to the delay time of the random sequence of signals, the function having a knee where the character of the function changes from being essentially related to statistics to being essentially related to real physical characteristics of the circuit; and sampling the random sequence of signals at a sampling rate corresponding to a point on the function between 50% and 125% of the sampling rate at the knee to generate the random sequence of signals.

The invention also provides a method of designing and fabricating a random number generator, the method comprising the steps of: designing and making a circuit for producing a binary random sequence of signals; measuring a first parameter of the binary sequence of signals, the parameter related to the serial dependence of the binary random sequence; calculating the degree of defects in randomness in the sequence for one or more levels of defect correction to determine the optimum number of levels of defect correction to produce a random number generator with a desired randomness quality; and fabricating a random number generator comprising the circuit and the optimum number of levels of defect correction. Preferably, the step of calculating comprises calculating the degree of defects in randomness as a function of a second parameter related to the delay time to determine the optimum number of levels for different values of the second parameter; and the step of fabricating comprises fabricating a random number generator having an optimum number of levels for a selected delay time. Preferably, the first parameter comprises one or more parameters selected from the group consisting of $B_2$ and $SD(t)$ and the second parameter comprises a parameter selected from the group consisting of delay time and sample rate. Preferably, the step of fabricating includes providing at least one level of defect correction comprising EXCLUSIVE OR gate means for combining pairs of consecutive binary signals in the sequence of signals. Alternatively, the step of fabricating includes providing at least one level of defect correction comprising a divider.

The invention also provides a method of generating a sequence of random numbers, the method comprising the steps of: providing a circuit for producing a binary random sequence of signals; measuring a parameter of the binary sequence of signals, the parameter related to the serial dependence of the binary random sequence; calculating the degree of defects in randomness in the sequence for one or more levels of defect correction to determine the optimum number of levels of defect correction for a desired randomness quality; and reducing the defects in the binary random sequence of signals by providing the optimum number of levels of defect correction.

The invention not only provides a high-quality true random number generator that interfaces easily with a personal computer, it also does this in a manner that allows the random number generator to be manufactured relatively inexpensively. Numerous other features, objects and advantages of the invention will become apparent from the following description when read in conjunction with the accompanying drawings.

DESCRIPTION OF THE PREFERRED EMBODIMENT

1. Overview

Figure 11:
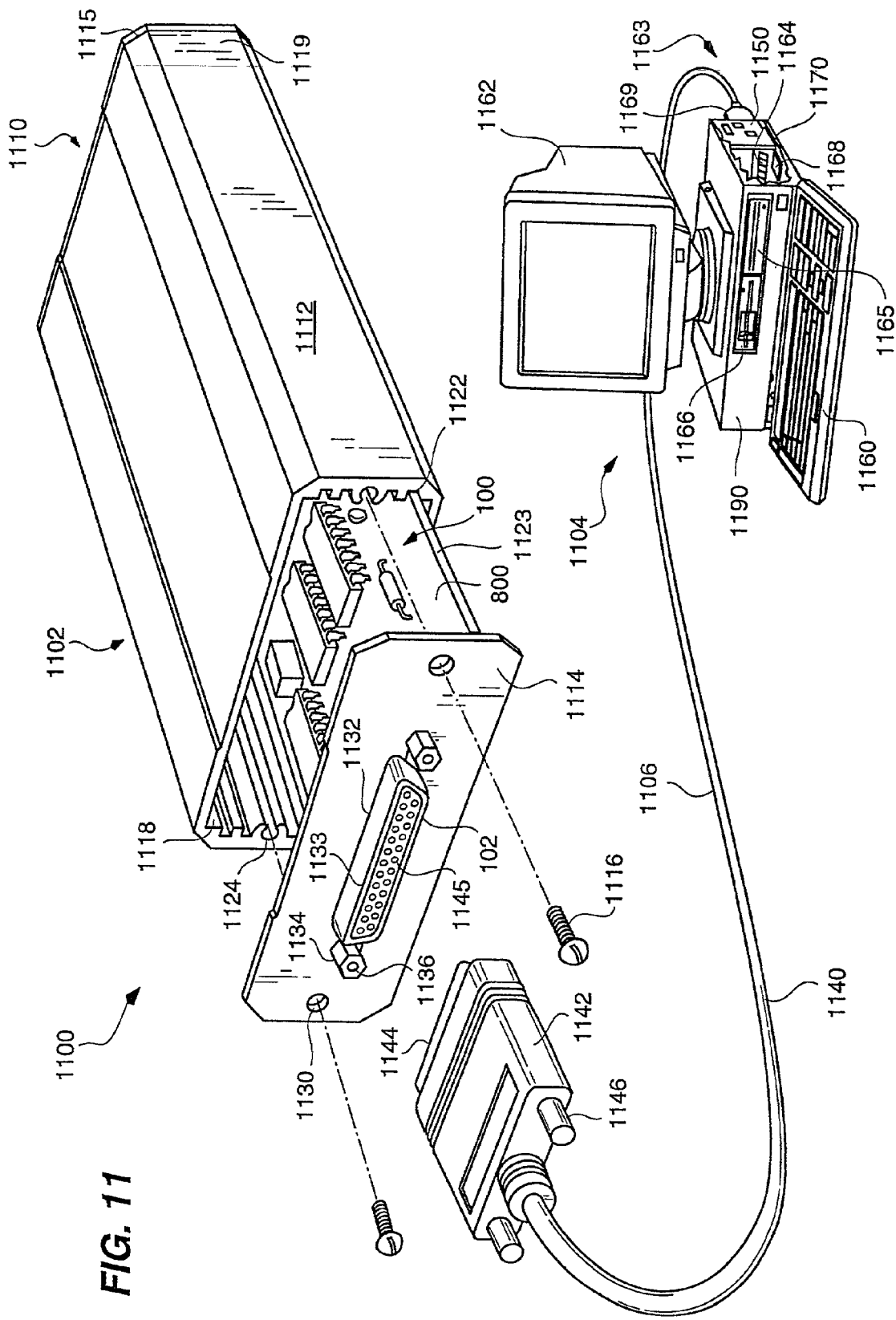
FIG. 11 is a perspective view of an RNG system according to the invention, including the RNG of FIG. 1 and a computer, showing the physical structure of the RNG and the manner of connection to the computer.

FIG. 11 shows the preferred embodiment of a random number generator (RNG) system 1100 according to the invention. It includes an electronic module 1102, a computer 1104, and a cable 1106 for electrically connecting computer 1104 and module 1102. In this embodiment module 1102 is a peripheral device 1102 of the computer 1104. Computer 1104 includes a memory 1163 which contains software 1200 (FIGS. 12A through 12D) for interfacing with module 1102, and a parallel port 1150 to which cable 1106 connects. Module 1102 includes a housing 1110 and a circuit 100 mounted on a circuit board 800 that is enclosed in housing 1110. It should be understood that the specific random number generator systems and circuits shown in the figures and described herein, are exemplary. That is, they are intended to show preferred examples of the invention so that those skilled in the art can fully understand and implement it. They are not intended to limit the invention to the specific examples described and shown.

In this disclosure the term "number" in the context of a random number generator means any signal that can be used to generate a binary or other number. That is, as known in the art of random number generators, the randomness may be in a sequence of binary signals, a Gaussian or any other distribution of signals, a sequence of signals representing a number between zero and one, a sequence of signals representing a decimal number, or in any other form that includes the desired randomness. In other terms, in this disclosure, random number generator, or RNG, means any device that produces a signal that can be converted to a random or pseudorandom sequence of such numbers. The term specifically includes generators of binary random sequences, or BRS's, but is not limited to such RNGs. The term "a parameter related to X", where X is some property of a system, includes the property; for example, the phrase, "a parameter related to the delay time", includes the delay time as well as other related parameters, such as sample rate.

Figure 1:
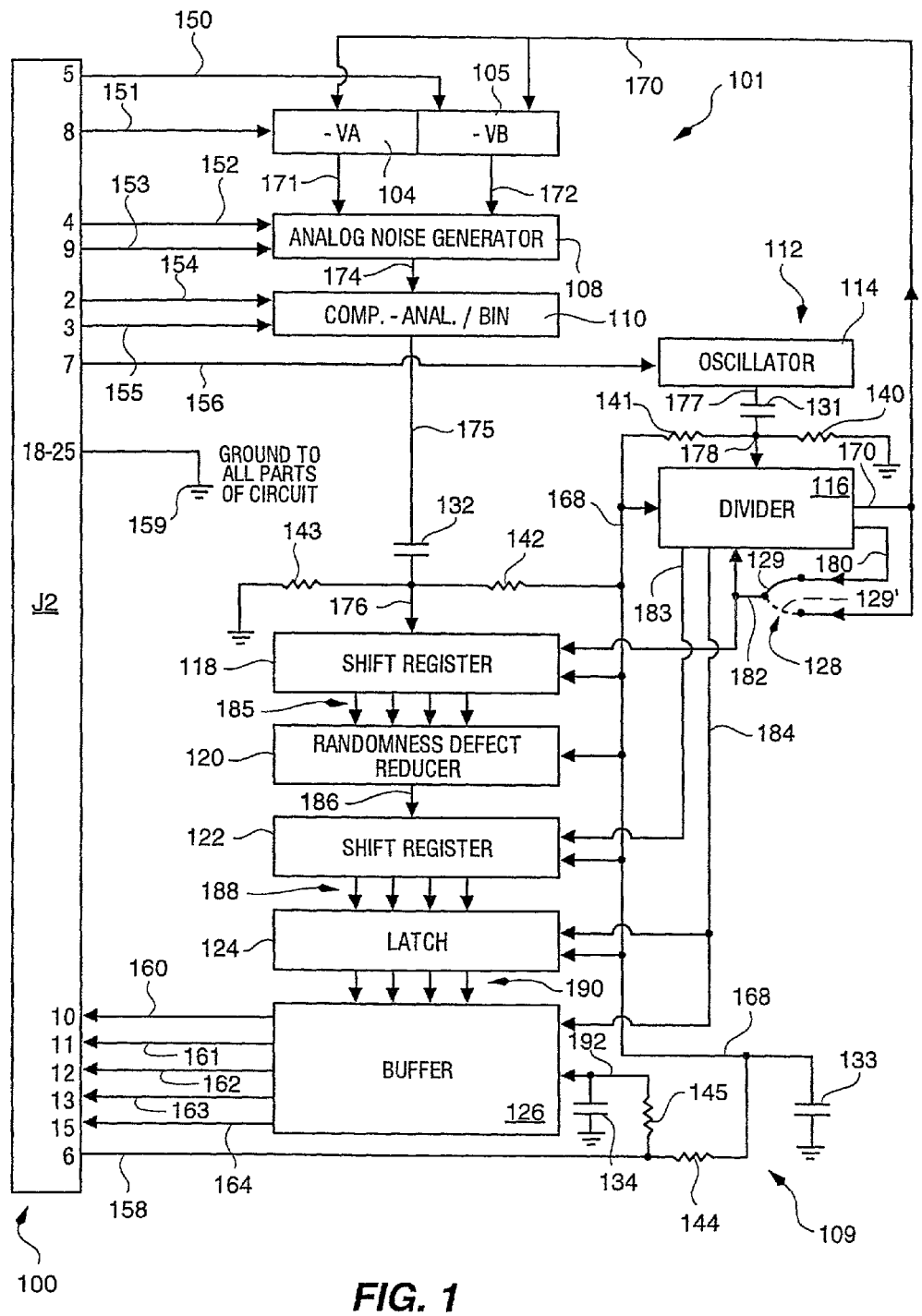
FIG. 1 is a block circuit diagram of the preferred embodiment of a random number generator according to the invention.

A block diagram of a preferred embodiment of RNG circuit 100 is shown in FIG. 1. RNG circuit 100 includes input/output port J2, charge pumps 104 and 105, analog noise generator 108, a high frequency compensator and analog to binary converter 110, clock 112, which includes oscillator 114 and divider 116, shift register 118, randomness defect reducer 120, shift register 122, latch 124, buffer 126, connector/jumper 128, capacitors 131–134, and resistors 140–145. The RNG circuit 100 can be divided into a low amplitude portion 101 that includes analog noise generator 108, and a normal amplitude portion 109 that includes the rest of the circuit 100. Here "low amplitude portion" means that portion of the circuitry in which the amplitude, i.e. voltage level, of the noise signal is below about 0.1 volts peak to peak.

Input/output port J2 is preferably a conventional DB-25, right-angle, PCB mount, female connector, and the numbers 2–15 and 18–25 next to the input lines 150–158 and output lines 160–164 indicate the pin numbers of the connector. Pins 5, 8, 4, 9, 2, 3, 7, and 6 provide positive voltage power sources for the various components of the RNG circuit 100, and pins 18–25 are the ground pins of the connector and provide the ground connection to the various components; ground in this disclosure is shown by three lines such as at 159. Note that pin 6 provides the power to multiple components of the digital circuit, i.e. divider 116, shift register 118, randomness defect reducer 120, shift register 122, latch 124, and buffer 126 via line 168, while the analog noise generator 108 and the high frequency compensator and analog to binary converter 110 have separate power sources, i.e. pins 4 and 9 and pins 2 and 3, respectively. The interrupt signal from the RNG circuit 100 is applied to pin 10, and a sequence of four-bit random words is applied to pins 11–15 by RNG circuit 100.

Charge pumps 104 and 105 provide a voltage of opposite sign to the voltage on pins 2–9 of connector J2, that is, a negative voltage. Thus they are labeled −VA and −VB, respectively. The negative voltage is necessary to run analog noise generator circuit 108. Pin 5 of connector J2 is connected to charge pump 104, and pin 6 is connected to charge pump 105. A 40 kHz clock pulse is applied to both of the charge pumps via line 170 from divider 116. Each of the charge pumps 104 and 105 apply the negative voltage to analog noise generator 108 via lines 171 and 172, respectively. Pins 4 and 9 of connector J2 connect to analog noise generator 108, the output of which is applied to high frequency compensator and analog to binary converter 110 via line 174. Pins 2 and 3 of connector J2 connect to high frequency compensator and analog to binary converter 110, the output of which is applied to shift register 118 through capacitor 132. The node 176 between capacitor 132 and shift register 118 is connected to power source line 168 through resistor 142 and to ground through resistor 143. Pin 7 of connector J2 is connected to oscillator 114, and the output of the oscillator is applied to divider 116 through capacitor 131. The node 178 between capacitor 131 and divider 116 is connected to power source line 168 through resistor 141 and to ground through resistor 140. As indicated above, line 170 from divider 116 provides a 40 kHz clock pulse; line 180 provides an 80 kHz clock pulse. Lines 170 and 180 connect to the two inputs of connector/jumper 128. The output 182 of connector/jumper 128 connects to divider 116 and to shift register 118. Divider 116 also applies a clock signal to shift register 122 via line 183, and another clock signal to latch 124 and buffer 126 via line 184. Shift register 118 applies four bits to randomness defect reducer 120 via lines 185, and randomness defect reducer 120 applies one bit to shift register 122 via line 186. Shift register 122 applies four bits to latch 124 via lines 188, and latch 124 applies four bits to buffer via lines 190. Line 158 from pin 6 of connector J2 is connected to power line 168 through resistor 144 and to buffer power line 192 through resistor 145. Power line 168 is connected to ground through capacitor 133, and buffer power line 192 is connected to ground via capacitor 134. Capacitor 133 and resistor 145 filter the power to buffer 126 while capacitor 134 and resistor 144 filter the power to the other digital components. The filtering for buffer 126 is separate from the filtering of the other components to isolate the buffer. Resistors 142 and 143 and capacitor 132 couple the AC signal on node 175 to an average voltage on node 176 that is at the midpoint "between the rails" of the electronic components of shift register 118. As is known in the art, "between the rails" means between the high and low voltages at which the components are being operated. Likewise resistors 140 and 141 and capacitor 131 couple the AC signal on node 177 to an average voltage on node 178 that is at the midpoint between the rails of the electronic components of divider 116.

Figure 8:
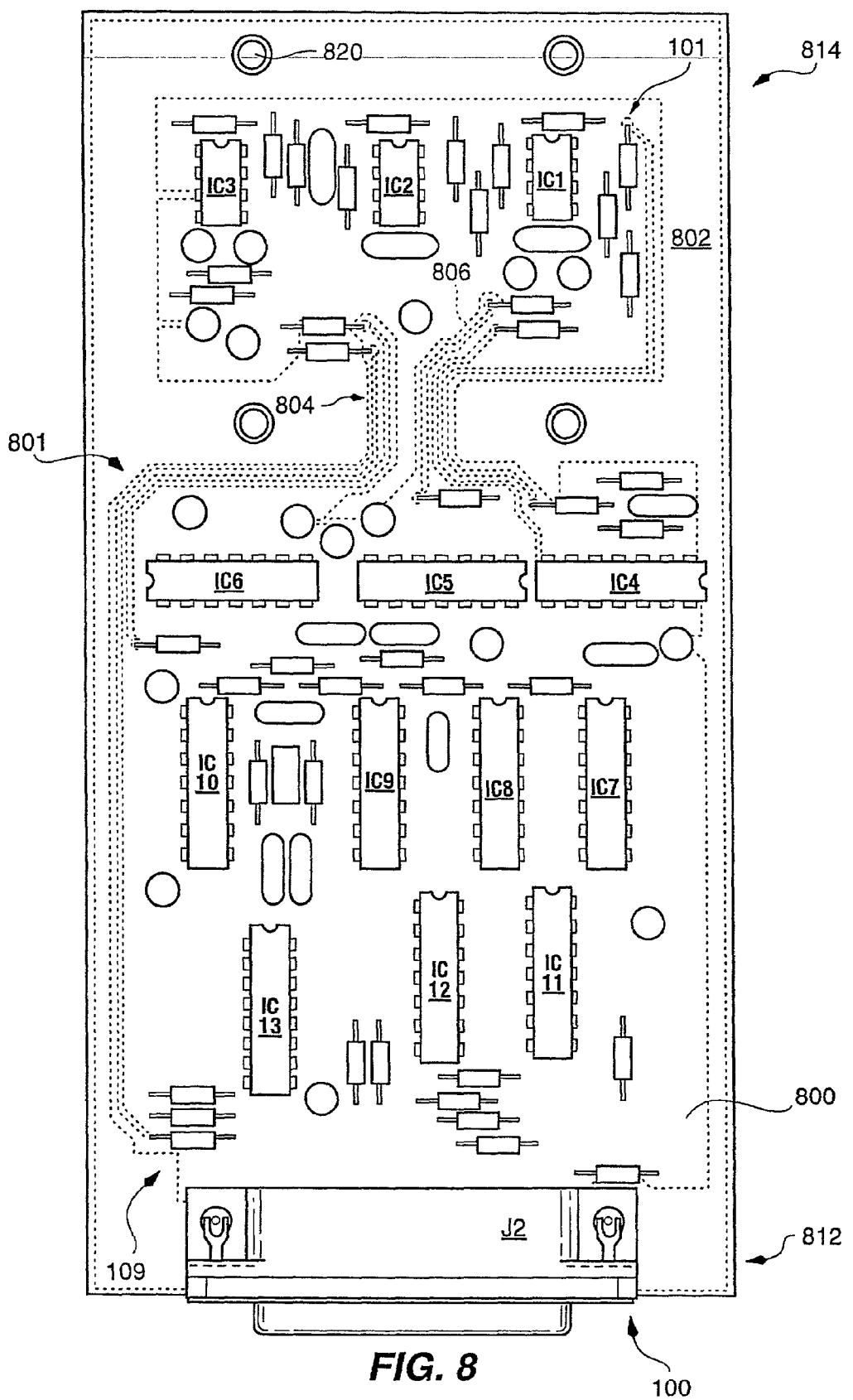
FIG. 8 is a plane view of the component side of the circuit board of the RNG of FIG. 1.
Figure 9:
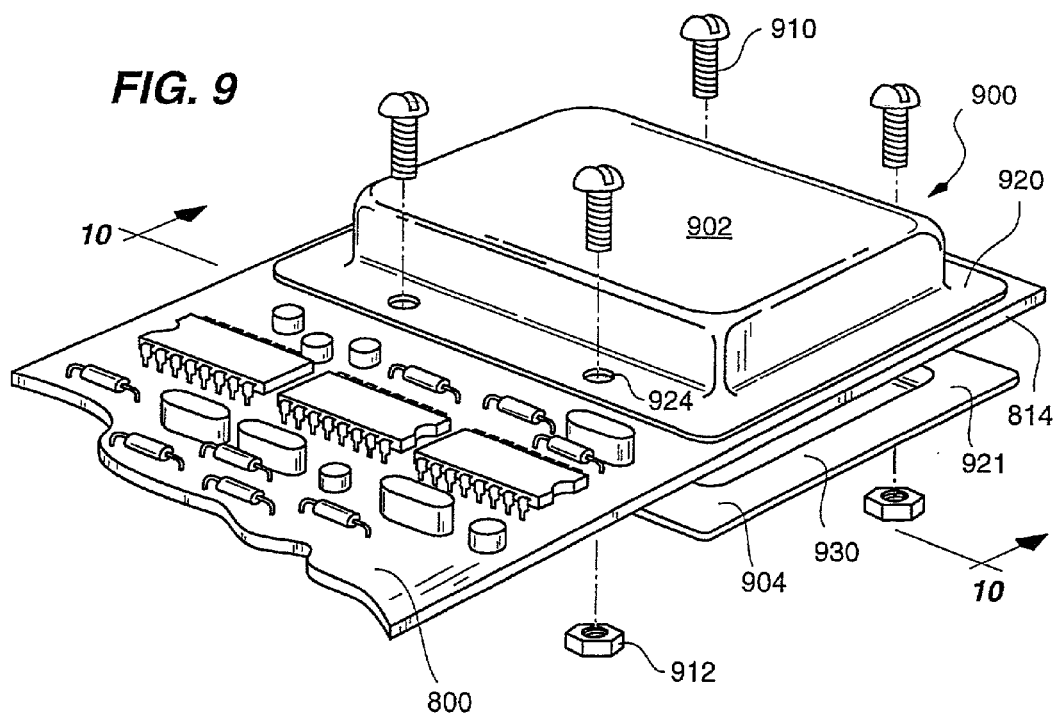
FIG. 9 is a perspective view of a portion of the circuit board of FIG. 8 showing the EMI shield and the manner of attaching it.
Figure 10:
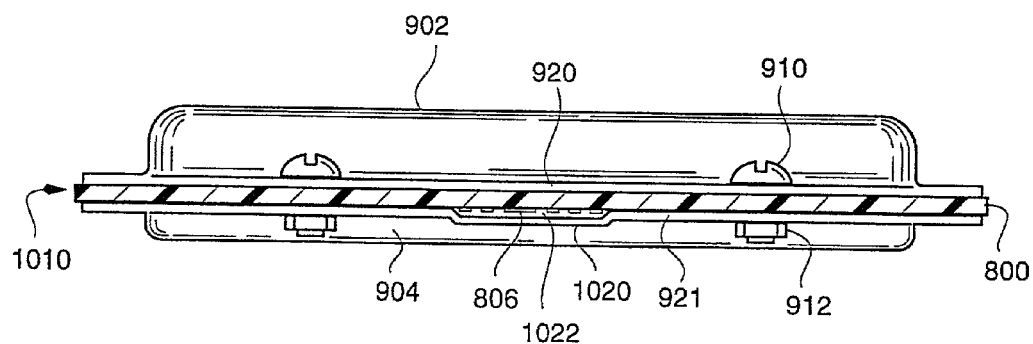
FIG. 10 is a cross-section taken through the line 10—10 in FIG. 9.
Figure 15:
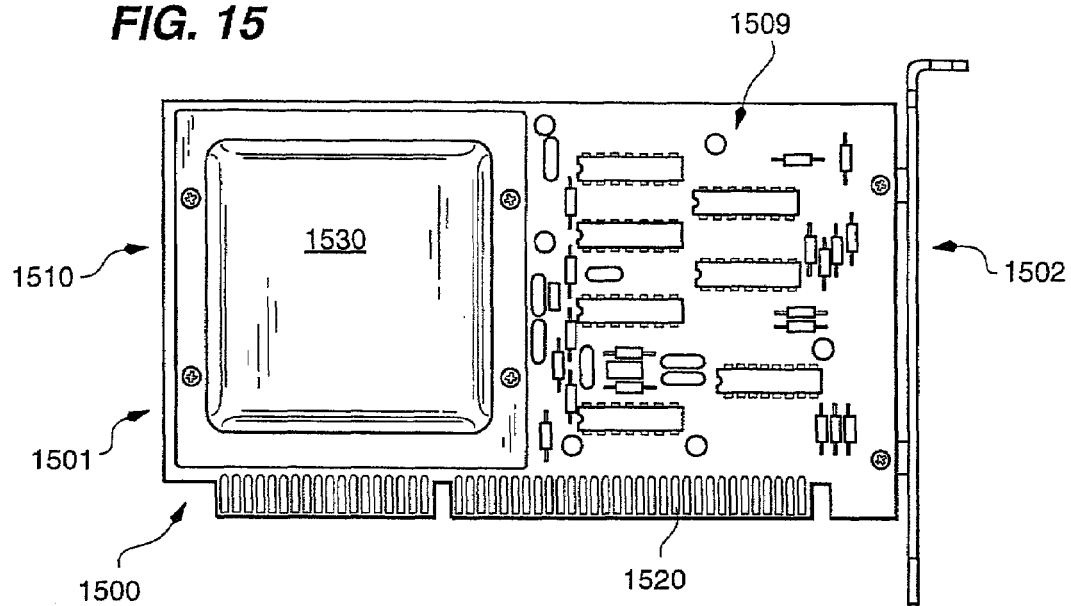
FIG. 15 shows an alternative embodiment of an RNG according to the invention that is mounted on a board that inserts into an expansion slot of a personal computer and interfaces directly through the personal computer's buss.
Figure 16:
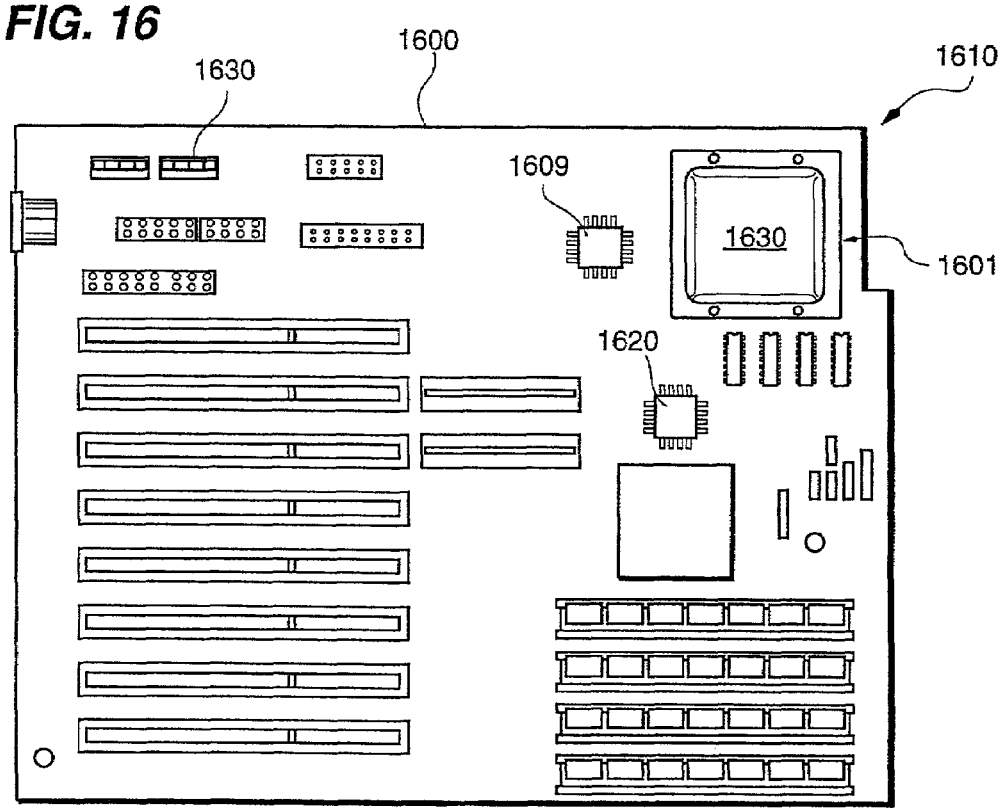
FIG. 16 shows an alternative embodiment of an RNG according to the invention mounted on the motherboard of a personal computer.

The detailed electrical circuits of the charge pumps 104 and 105, the analog noise generator 108, the high frequency compensator and analog to binary converter 110, the clock 112, the shift registers 118 and 122, the randomness defect reducer 120, the latch 124, and the buffer 126 are given in FIGS. 2 through 7. The physical layout of the circuits on a circuit board 800 is shown in FIG. 8, a shield 900 that shields the low amplitude portion 101 of the circuitry 100 is shown in FIGS. 9 and 10, and the manner in which the circuit 100 on circuit board 800 fits within housing 1110 and is connected to the rest of the system 1100 is shown in FIG. 11. FIG. 15 shows a portion of another embodiment of an RNG system 1500 in which the RNG circuit 100 is mounted on an add-on board 1502 for mounting within the case of a personal computer 1104. FIG. 16 shows a portion of a third embodiment of an RNG system 1600 in which the circuit 100 is mounted directly on the motherboard of a PC 1104.

Figure 17:
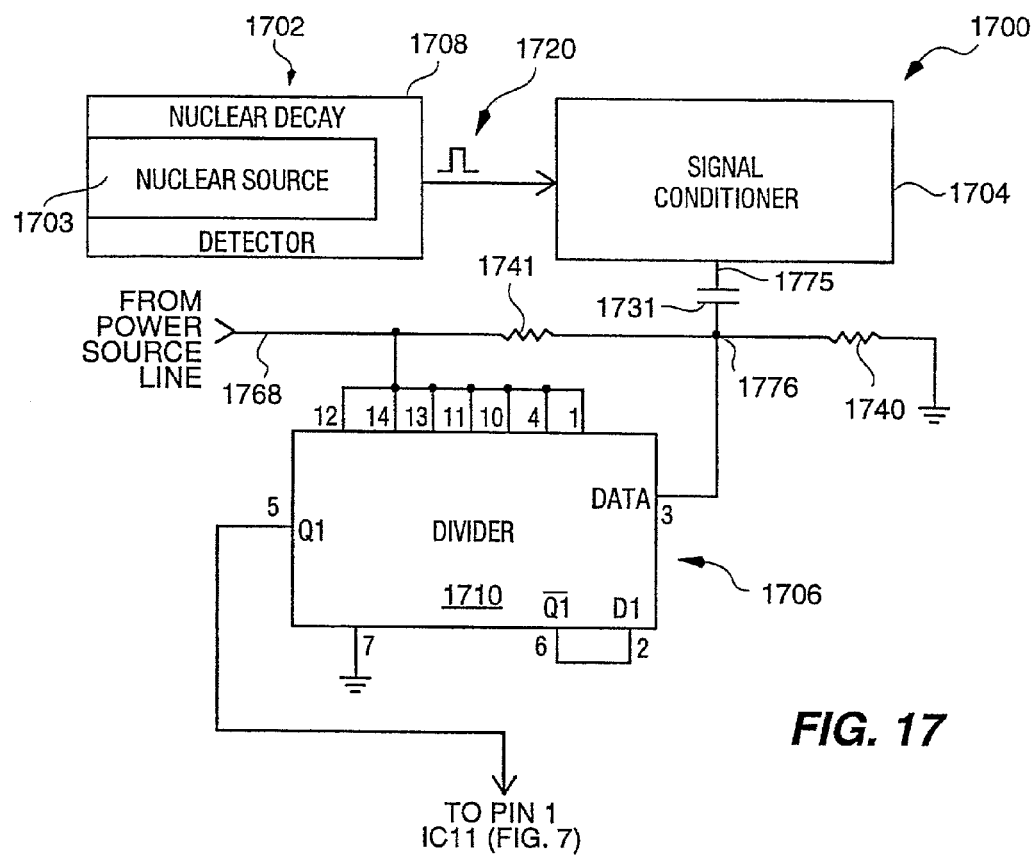
FIG. 17 is a partially block circuit diagram of another preferred embodiment of the random number generator according to the invention.

In the circuit 100 of the embodiment of FIG. 1, a resistor 300 (FIG. 3) is ultimately the source of the essentially random pulses that produce the random numbers, and a set of three EXCLUSIVE OR (XOR) gates 120 (FIG. 7) correct for randomness defects. FIG. 17 shows an alternative embodiment of an RNG circuit 1700 in which an intrinsically random quantum source 1702 provides the true random pulses that produce the random numbers, and a divider 1710 transforms the pulse sequence into a sequence with random transition timing and equal 1, 0 probability. As will be clear from the following description, the RNG according to the invention may be implemented in other ways, other sources of random pulses and other randomness defect correctors may be used, and those shown may be used in other combinations. The examples just summarized are intended to illustrate the invention sufficiently that those skilled in the art may practice it either as shown or in many other ways.

2. Detailed Description

Figures 2, 3:
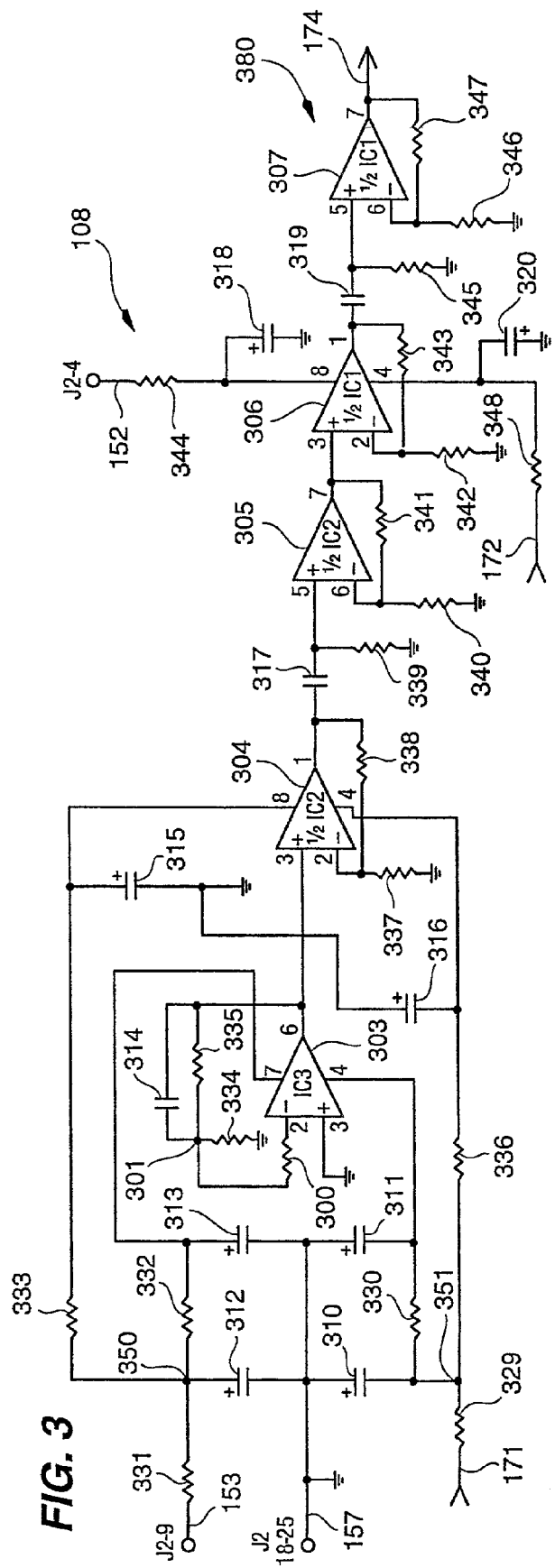
FIG. 2 is a circuit diagram of the charge pump of the random number generator of FIG. 1.
FIG. 3 is a circuit diagram of the analog noise generator of the RNG of FIG.

FIG. 2 is a detailed circuit diagram of the charge pump 105 utilized in the preferred embodiment of the invention. Charge pump 105 includes integrated circuit IC5, capacitors 210–213, and resistors 220 and 222. Charge pump 105 could also be considered to include other elements, such as capacitor 310 in FIG. 3; however, capacitor 310 has been made a part of analog noise generator 108 so that the circuits for the two charge pumps 104 and 105 are identical, which simplifies the discussion. Thus, it should be understood that, in the present disclosure, whether a particular component is included in one subcircuit rather than another is often a matter of convenience.

Integrated circuit IC5 preferably is a CD74HC4053E triple 2-channel analog multiplexer available from Harris Semiconductor. This is a CMOS low-power chip, which allows the system to be run off the power available on the parallel port 1150 of a computer. For this and the other integrated circuits shown in the drawings, the pins are shown as lines connected to the rectangle representing the IC, or a triangle representing a portion of an IC, and the numbers next to the lines indicate the pin numbers. A+ sign next to a capacitor indicates that the capacitor is preferably a polarized capacitor and designates the positive side of the capacitor. Pins 1 and 7 of IC5 are connected together, to ground through capacitor 212, and to line 172. Pins 9, 10, and 11 are connected together and to clock line 170 through capacitor 213 and resistor 222 in parallel. Pins 16, 12, and 5 are connected together, to ground through capacitor 210, and to the No. 5 pin of connector J2 through resistor 220. Pins 14 and 4 are connected together and to pin 15 through capacitor 211. Pins 2, 3, 6, 8, and 13 are connected to ground.

Charge pump 104 is identical to charge pump 105. As indicated in FIG. 1, it is connected to pin 5 rather than pin 8 of connector J2, and its output is connected to analog noise generator 108 is via line 171 instead of line 172. Two charge pumps are used because of limited current available on the pins of connectors J2. As known in the electronics art, charge pumps are used to produce a negative voltage from a positive one. The charge pumps operate by a positive charge being placed on the + side of capacitor 211 in one half-clock-cycle, which attracts a negative charge to the opposite side. This negative charge is transferred to output pins 1 and 7 and accumulates on the negative side of capacitor 212 on the next half-clock-cycle. Capacitor 210 and resistor 220 form a filter circuit for filtering transients and noise on the power supply pin 5 of connector J2. Similarly, as will be seen below, each of the other connections to the power supply pins 2 through 9 of connector J2 has such a filter circuit to isolate the circuit 100 from transients. The circuit formed by capacitor 213 and resistor 222 couples the clock signal into the charge pump and also limits the current in the circuit and protects the circuit if the wrong voltage is placed on any of the pins 5 through 8 of connector J2. It is noted that the charge pumps run off of an external clock, unlike some commercially available charge pumps. While the RNG circuit 100 according to the invention is powered by the data lines of a parallel port 1150 and a pair of charge pumps 104 and 105, other power sources may be used. The control lines of the parallel port 1150 may also be used as a power source. In some embodiments the preferred power source is a power supply separate from that of computer 1105, such as a battery together with a voltage regulator. Such an independent power supply is preferred when the random number generator is used for cryptographic purposes.

The negative voltage produced by the charge pumps is used by the analog noise generator circuit 108. Turning to FIG. 3, the preferred embodiment of the detailed circuit for analog noise generator 108 is shown. It includes three integrated circuits, IC1, IC2, and IC3, capacitors 310 through 320, and resistors 329 through 347. Integrated circuits IC1 and IC2 are preferably TL062CN's and integrated circuit IC3 is preferably a TL061CN, both low-power JFET operational amplifier packages available from SGS-Thompson. 103 includes one op amp 303, while IC2 and IC1 both include two op amps, 304 and 305 and 306 and 307, respectively. Together, the op amps 303–307 comprise a five-stage, low-noise, low-power, high-input-impedance amplifier 380. Node 351 is connected to line 171 through resistor 329. Pin 4 of IC3 is connected to node 351 through resistor 330 and to ground, i.e. pins 18–25 of connector J2, through capacitor 311. Node 351 is also connected to ground through capacitor 310. Pin 3 of IC3, which is the non-inverting input of op amp 303, is connected to ground. Pin 2 of IC3, which is the inverting input of op amp 303, is connected to node 301 through thermal noise generating resistor 300. Node 301 is connected to ground through resistor 334 and to the output of op amp 303, i.e. pin 6 of IC3, through resistor 335 and capacitor 314 in parallel. Pin 7 of IC3 is connected to ground through capacitor 313 and to node 350 through resistor 332. Node 350 is connected to ground through capacitor 312 and to the No. 9 pin of connector J2 through resistor 331. Output pin 6 of IC3 is connected to the non-inverting input of op amp 304, i.e. pin 3 of IC2. The inverting input of op amp 304, i.e. pin 2 of IC2, is connected to ground through resistor 337 and to its input, pin 1 of IC2, through resistor 338. Pin 4 of IC 2, the V− supply, is connected to ground through capacitor 316 and to node 351 through resistor 336. Pin 8 of IC2, the V+ supply, is connected to node 350 through resistor 333 and to ground through capacitor 315. The output of op amp 304, pin 1 of IC2, is connected to the non-inverting input of op amp 305, pin 5 of IC2, through capacitor 317. Pin 5 of IC2 is also connected to ground through resistor 339. The inverting input of op amp 305, pin 5 of IC2, is connected to its output, pin 7 of 102, through resistor 341, and to ground through resistor 340. Op amp 305 also has connections to V+ (pin 8) and V− (pin 4), but as is conventional in electronic notation, these are not shown again. The output of op amp 305, pin 7 of IC2, is connected to the non-inverting input of op amp 306, pin 3 of IC1. Pin 4 of IC 1, the V− supply, is connected to line 172 through resistor 348 and to ground through filter capacitor 320, while pin 8, the V+ supply, is connected to the No. 4 pin of connector J2 through resistor 344 and to ground through capacitor 318. The other pins of IC1 are connected as were the pins of IC2, with resistor 342 being connected between pin 2 and ground, resistor 343 being connected between pin 2 and pin 1, capacitor 319 being connected between pin 1 and pin 5, resistor 345 being connected between pin 5 and ground, resistor 346 being connected between pin 6 and ground, and resistor 347 connected between pin 6 and pin 7. The output of op amp 307, pin 7 of IC1, is connected to line 174 which is the output to the high frequency compensator and analog to binary converter 110 (FIG. 4).

Capacitors 310–313, 315, 316 and 320 are power supply filter capacitors. The power supply is unregulated, since the voltage and current overhead of a regulator would greatly reduce the power available through connector J2. Capacitors 317 and 319 are high pass filters which remove the input offset voltages which could drive the system to saturation if amplified. Each of amplifiers 303–307 has a pair of resistors, such as resistors 334 and 335 associated with op amp 303, which form a voltage divider that determines the gain of the amplifier. The gain of amplifiers 303–307 are approximately 3.8, 6.6, 6.6., 6.6, and 6, respectively. The TL06X integrated circuits, where X is 0, 1, 2, and 4, are very low power amplifiers that permit the circuit to be run off the parallel port 1150. Other amplifiers that could be used include the National Semiconductor LF44Y op amp, where Y=1, 2, or 4 and the Burr-Brown AD548 and AD648 single and dual op amps. The use of one or more of these op amps or equivalent op amps in the amplification function is a feature of the invention. Less than a milliamp is pulled from each power supply pin of connector J2. Resistor 300 is the noise generating resistor. The noise of resistor 300 and the noise of amplifier 303 add to generate the total noise input to the series of amplifiers 304–307. The resistor noise is essentially flat, that is, flat within ±0.1 db from about 1 Hz to several hundred kHz, while the noise of the amplifier follows a typical 1/f curve at low frequencies. The amplifier 303 contributes about 25% of the total noise. It is a feature of the invention that the amplifier 303 contributes only up to one-third of the total noise output on pin 6. The output signal at 174 is, on the average, essentially within ±1 db from about 100 Hz to about 120 kHz and about 1.8 volts peak to peak.

Figure 4:
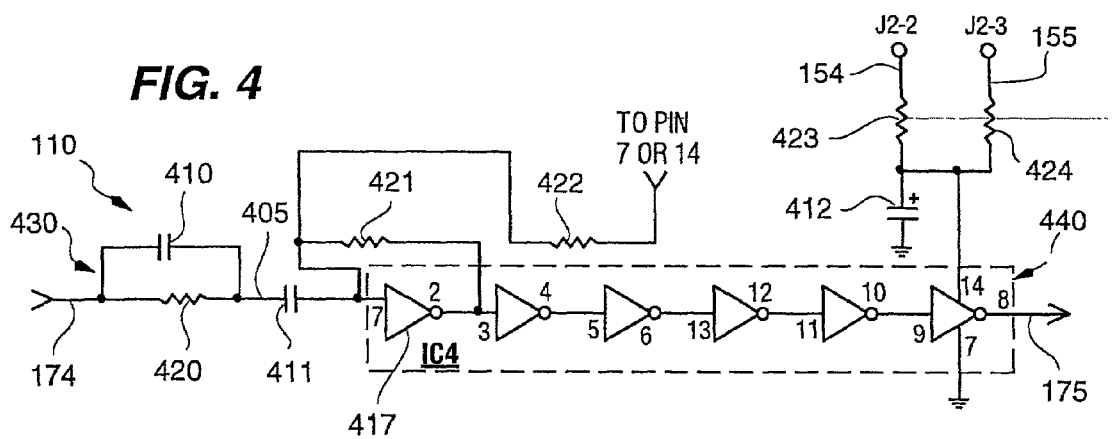
FIG. 4 is a circuit diagram of the high frequency compensator and analog to binary converter of the RNG of FIG. 1.

FIG. 4 shows the detailed circuit diagram for the high frequency compensator and analog to binary converter 110. Circuit 110 includes integrated circuit IC4, enclosed by the dotted fine in FIG. 4, capacitors 410–412, and resistors 420–424. Integrated circuit IC4 is preferably a CD74HCU04E hex inverter available from Harris Semiconductor. Input line 174 is connected to node 405 through capacitor 410 and resistor 420 in parallel, and node 405 is connected to pin 1 of IC4 through capacitor 411. Pin 1 of IC4 is connected to pin 2 through resistor 421, and to one of pin 7 or pin 14 of IC4 through resistor 422. The choice of whether it is connected to pin 7 or pin 14 of IC4 depends on whether the internal reference is offset low or high. Pin 7 is connected to ground. Pin 2 is also connected to pin 3, pin 4 is connected to pin 5, pin 6 to pin 13, pin 12 to pin 11, and pin 10 to pin 9. Pin 14 of IC 4 is connected to ground through capacitor 412, to the No. 2 pin of connector J2 through resistor 423 and to the No. 3 pin of connector J2 through resistor 324. The latter connection provides the Vcc connection of IC 4. As before, the pin 14 and pin 7 connections also represent the connections of each of the six inverters in IC4 to Vcc and ground. In this configuration, the six inverters of IC4 are linked output to input in series. The output of the sixth inverter on pin 8 of IC4 provides the output of analog to binary converter 110 on line 175.

The XHCU04 IC, where X is 54 or 74, is a low-power CMOS chip that has very fast operating speed. While the chip is termed a hex inverter, in the configuration shown in FIG. 4 the first inverter provides a linear amplifier 417 and the last five provide a comparator 440. The first inverter 417 and the circuitry to the left of it in FIG. 4 comprise a high frequency compensator 430. The compensator 430 is part of the analog circuit. The output signal on pin 2 of IC4 is an analog signal that goes both above and below a reference voltage that is internal to IC4. Comparator 440 provides the analog to binary conversion for the RNG. Comparator 440 compares the voltage on its input, pin 3 of IC4, with the internal reference voltage and produces a "high" output if the input signal is above the reference and a "low" output if the signal is below the reference voltage. Preferably, the "high" output is a positive voltage between about 1.8 volts and 3.5 volts, and the "low" output is zero voltage. Since each of the five comparator stages also amplifies the output signal, it can also be viewed as a fast, low-power, CMOS amplifier 440. The use of the XHCU04 chip as a comparator to create a binary signal from the analog signal is a feature of the invention. Its use ultimately permits a high output bit rate while using only the power from the parallel port 1150. Each inverter in the series in effect speeds up the transitions between the "high" state and "low" state. Thus all five inverters are used to provide as fast a transition as possible. The intrinsic bias level of the CMOS inverters is caused to appear as the average level at pin 2 because of the negative feedback loop provided by resistor 421. Precise trimming of this bias is accomplished by selecting resistor 422 so that the output of the analog to binary converter 110 has a balanced 1/0 probability.

The series impedance of resistor 420 and capacitor 411 determine the high pass cut-off frequency according to the formula fc=1/2πRC. The selection of this frequency is also a feature of the invention. In the preferred embodiment, the cut-off frequency is approximately 36 Hertz. It is known to use high pass filters to cut off the low frequency 1/f tail in amplifiers. However, the inventor has recognized that cutting off any of the band-width of the circuit 100 introduces defects in the randomness of the sequence generated by the circuit.

Figure 13:
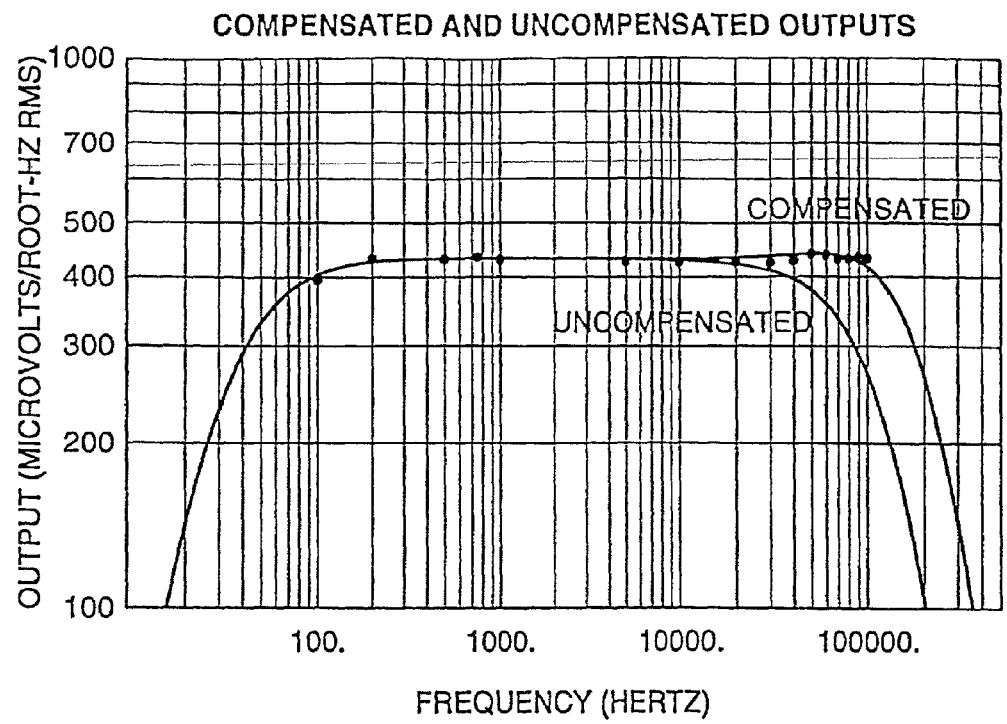
FIG. 13 is a graph of the compensated and uncompensated outputs as measured at the output of the inverter 417 in FIG. 4.

The parallel impedance of resistor 420 and capacitor 410 produces a high frequency pole which compensates for a high frequency drop off in the incoming signal, which drop off is typical of amplifiers. The effect of compensation on the output at pin 2 of IC 4 is shown in FIG. 13. The output at pin 2 in microvolts per root-Hertz is shown for the uncompensated and compensated outputs. Actual measured values are given as solid dots and the theoretical values are shown as solid lines. The high frequency pole alters the signal so that at pin 2 of IC4 the −3 db point goes out to about 170 kHz.

Figure 5:
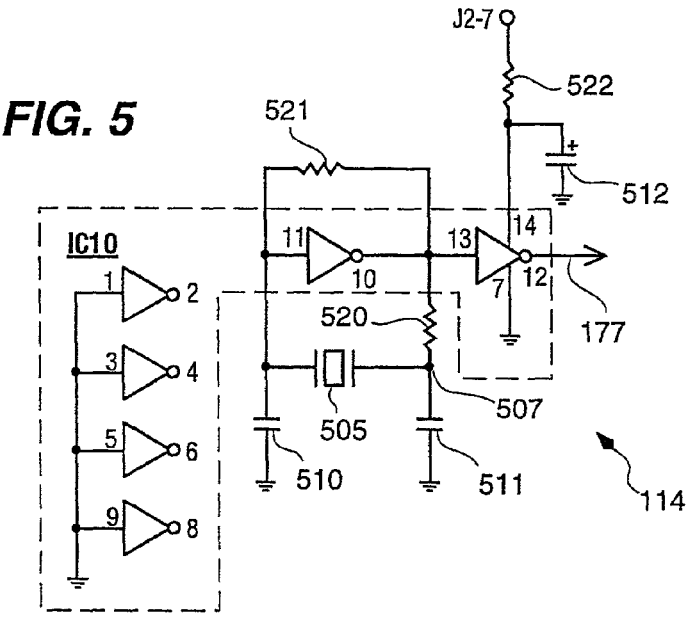
FIG. 5 is a circuit diagram of the oscillator portion of the clock of the RNG of FIG. 1.

Turning to FIG. 5, the oscillator circuit 114 is shown. Oscillator 114 includes integrated circuit IC10, enclosed by the dotted line in FIG. 5, resonator 505, capacitors 510–512, and resistors 520–522. Integrated circuit IC10 is also preferably a CD74HCU04E hex inverter available from Harris Semiconductor. Four of the six inverters in IC10 are not used in this application, and their inputs, pins 1, 3, 5 and 9, are connected to ground. Pin 11 of IC10 is connected to pin 10 through resistor 521, and pin 10 is connected to pin 13. Pins 10 and 13 are also connected to node 507 through resistor 520. Resonator 505 is connected between pin 11 and node 507. Pin 11 is also connected to ground through capacitor 510, and node 507 is connected to ground through capacitor 511. Pin 14 is connected to the No. 7 pin of connector J2 through resistor 522 and to ground through capacitor 512, which again represents the VCC and ground connections of all the inverters in the integrated circuit. Pin 12 provides the output of oscillator 114 on line 177. Resonator 505 is preferably a 640 kHz ceramic resonator available from Panasonic.

Figure 6:
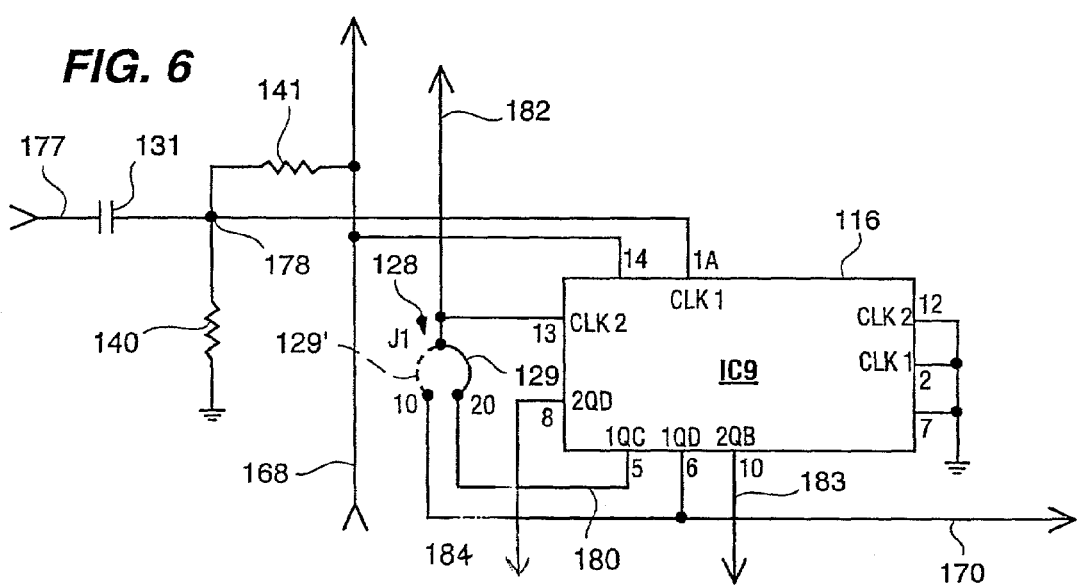
FIG. 6 is a circuit diagram of the divider portion of the clock of the RNG of FIG. 1.

FIG. 6 shows the detailed circuit diagram of divider 116. Divider 116 comprises integrated circuit IC9, which is preferably a 74HC393 dual 4-bit binary counter available from Harris Semiconductor. Other components of the circuit of FIG. 1 are also shown in FIG. 6 for ease of reference. Connector/jumper 128 is preferably a Berg 3 pin connector together with a Berg jumper. Pin 1 of IC9 is connected to node 178, which carries the output signal from oscillator 114. Pins 2, 7, and 12 are grounded. Pin 14 is connected to the power source line 168. Pin 13 is connected to the output line 182 of connector/jumper 128. Pin 8 provides the clock output signal to latch 124 and buffer 126 on line 184. Pin 5 is connected to one input, pin 20, of connector/jumper 128, and pin 6 is connected to the other input, pin 10, of the jumper and also provides the 40 kHz clock signal on line 170.

Pin 10 is connected to the line 183 which provides the clock signal to shift register 122. As is known in the art, the symbols on the inside of the rectangle 116 representing IC9 are the signals on the respective pins. These are shown for IC9 and for other integrated circuits discussed below to assist those skilled in the art to more easily understand the functions of these circuits.

As indicated above, the basic clock cycles originate from a ceramic resonator 505 which resonates at 640 khz. Both IC10 and IC9 are CMOS integrated circuits. Capacitor 131 and resistors 140 and 141 couple the output of oscillator 114 to the clock input of IC9 at an average voltage midway between the rails of IC9. IC9 contains two independent four-stage binary counters. The output of the first counter provides an output cycle on pin 5 for every eight cycles of resonator 505 to produce the 80 kHz clock signal and an output cycle on pin 6 for every sixteen cycles of resonator 505 to produce the 40 kHz clock signal. Whichever signal is selected by connector/jumper 128, is fed back into the second binary counter via pin 13. The second binary counter provides an output cycle on pin 10 for every four cycles on pin 13, which output cycle clocks shift register 122, and an output cycle on pin 8 for every sixteen cycle on pin 13, which cycle drives the interrupt buffer in IC13 (FIG. 7) and clocks the latch IC12 (FIG. 7).

Figure 7:
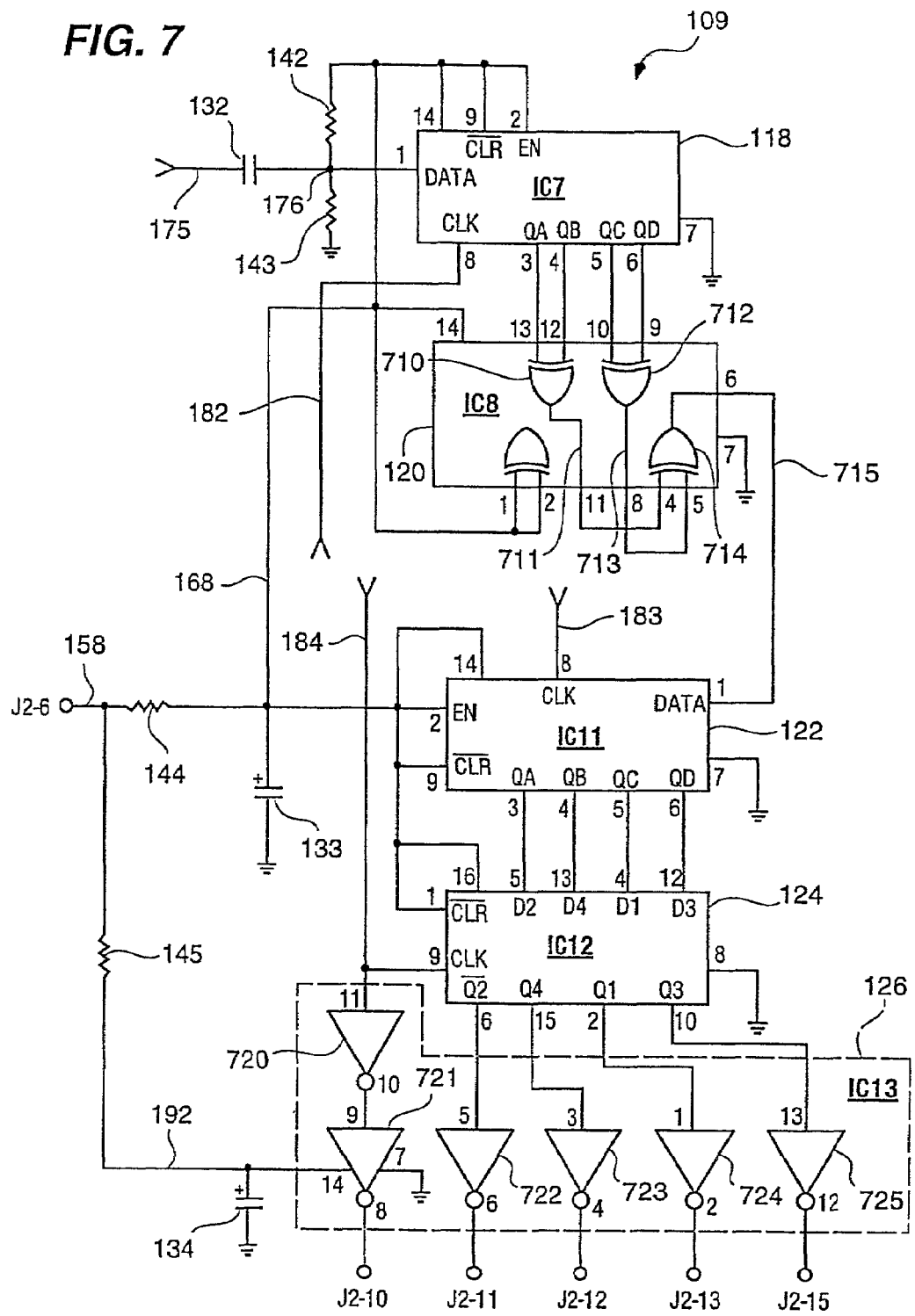
FIG. 7 is a circuit diagram of the digital portion of the RNG of FIG. 1.

The remainder of the normal amplitude portion 109 of RNG circuit 100 is shown in FIG. 7. This portion of the circuit 100 includes shift register 118, randomness defect reducer 120, shift register 122, latch 124, and buffer 126. Other elements of the circuit of FIG. 1 are also shown in FIG. 7 for ease of reference. Shift register 118 preferably comprises an integrated circuit IC7 and shift register 122 is preferably an integrated circuit 1011, both of which are preferably a CD74HC164E, a serial-in/parallel-out shift register available from Harris Semiconductor. In the configuration shown, both are essentially serial-to-parallel converters. Randomness defect reducer 120 is preferably an integrated circuit IC8, which is preferably a CD74HC86E, a quad 2-input EXCLUSIVE OR gate available from Harris Semiconductor. Latch 124 is preferably an integrated circuit IC12, which is preferably a CD74HC175E quad D-type flip-flop with clear, and is also available from Harris Semiconductor. Buffer 126 is preferably an integrated circuit IC13, which is preferably a CD74HC14E hex inverting Schmidt trigger available from Harris Semiconductor.

Pin 1 of IC7 is connected to node 178 which carries the output signal from analog to binary converter 110. Pins 14, 9 and 2 are connected together and to the power source line 168. Pin 8 is connected to the output of connector/jumper 128 via line 182, and pin 7 is grounded. Pins 3, 4, 5, and 6 of IC 7 provide the 4-bit output of shift register 118 and are connected to pins 13, 12, 10, and 9, respectively, of IC8 which are the inputs to XOR gates 710 and 712. Pin 14 of IC8 is connected to power source line 168, and pin 7 is grounded. Pins I and 2 are also connected to line 168, which holds one XOR gate in IC8, which gate is not used, in a static state when the circuit is on. Pins 11 and 8, which are the outputs of XOR gates 710 and 712, respectively, are connected to pins 4 and 5, which are the inputs of XOR gate 714. Pin 6 of IC 8 is the output of XOR gate 714 and randomness defect reducer 120 and is connected to pin 1, the data input, of IC11. Pins 14, 2, and 9 of IC1 are connected to power source line 168, and pin 7 is grounded. Pin 8, the clock input, is connected to pin 10 of divider 116 via line 183. Pins 3, 4, 5, and 6 provide the outputs of shift register 122 on which the 4-bit output word of the RNG circuit 100 is output to pins 5, 13, 4 and 12, respectively, of latch 124, IC12. Pins 1 and 16 of IC12 are connected to the power source line 168, and pin 8 is grounded. Pin 9, the clock input of IC12, is connected to pin 8 of IC9 via line 184. Pins 6, 15, 2, and 10 of IC12 provide the latched output of IC12 and are connected to pins 5, 3, 1, and 13 of buffer 126, IC13, respectively. Pin 14 of IC13 is connected to power line 192 and pin 7 is grounded. As usual, these connections to interrupt signal driver 721 reflect the same connections to interrupt signal driver 720 and the bit drivers 722 through 725. Pin 11 of IC13, the input to the interrupt circuit comprising drivers 720 and 721, is connected to the clock output pin 8 of IC9 via line 184. Pin 8 of IC13 provides the interrupt signal and is connected to the No. 10 pin of connector J2. Pins 6, 4, 2, and 12 of IC13 provide the outputs for the four bits of the random sequence word output by RNG circuit 100 and are connected to the No. 11, 12, 13, and 15 pins of connector J2, respectively.

Capacitor 132 and resistors 140 and 142 AC couple the output of IC4 (FIG. 4) to the DATA input of IC7 (FIG. 7) at an average voltage midway between the rails of IC7. The signal into the clock input, pin 8, of IC7 is 80 khz if the jumper 129 of connector/jumper 128 is in the position shown by the solid line in FIGS. 1 and 6, and is 40 kHz if the jumper 129' is in the position shown by the dotted line.

The selection of the clock frequency of the shift register 118, and thus the sampling frequency of the RNG circuit 100 is a feature of the invention. The selection of this frequency may be understood more easily by reference to FIG. 14, which shows the logarithm of the absolute value of the measured serial dependence of the adjusted output of analog to binary converter at node 176 as a function of the delay time between samples in microseconds. As can be seen from the figures, the serial dependence curve at high sample rates, i.e. low delay times, is an essentially logarithimically decreasing curve approximated by line 14A. At low sample rates, the serial dependence goes essentially flat, as approximated by line 14B. The logarithimically decreasing line arises from the transfer function of the analog circuitry and the nature of the statistics, while the flat, horizontal line is a result of using limited, real components to build the circuit. The dots show the measured values for the preferred embodiment of the invention, which values may depart significantly from the limiting lines 14A and 14B for individual measurement, but overall will be below the limiting curves. A knee is formed in the measured curve at approximately the point where lines 14A and 14B meet. It is a feature of the invention that the sampling frequency is selected to be at or below this knee, i.e. at or below the point of intersection of the logarithimically decreasing statistical curve and the essentially flat real curve, which point of intersection for the circuit 100 is at a delay time of approximately 12.5 microseconds as indicated by line 14C. This delay time converted to sampling frequency gives 80 kHertz. This sampling frequency is optimum because, if a faster sampling frequency is chosen, the serial dependence, and thus the defectiveness in randomness, increases dramatically. If the sampling frequency is chosen to be lower, a lower bit rate is produced with little gain in randomness. For some applications, choosing a sampling frequency about 25% higher than the knee will not produce an unacceptable increase in randomness defects. However, beyond this point, the limiting curve 14A increases dramatically above line 14B, and therefore indicates significant defects in randomness. Thus, in the preferred embodiment, the sampling rate is chosen to be from a non-zero value that is suitably fast for the computer 1104 up to a rate that is 125% of the rate at the knee.

Some computers, especially older, slower ones, cannot easily accept and process random bits at the 20 kHz rate. Thus, the preferred embodiment of the invention provides the option of placing the jumper 129 in the position 129' in FIGS. 1 and 6, and thus choosing an output bit rate of 10 kHz.

Assuming a clock rate or 80 kHz is selected, 20,000 times a second, four bits will be clocked into shift register 118. These four bits are output to randomness defect reducer 120. It is a feature of the invention that randomness defect reducer 120 comprises two levels of EXCLUSIVE OR functions. A third level is optional; this would reduce the randomness defects even more, but would reduce the rate of production of bits in the random sequence. As will be discussed in detail below, an equation devised by the inventor was used to predict that only two levels of defect correction will provide a random sequence that is acceptable for most users of the RNG. As is known in the art, in an XOR operation the output is "low" when both inputs are either both "high" or both "low", and the output is "high" when the two inputs are opposite. In the first level of XOR function, the bits on pins 3 and 4 of shift register 118 are XOR'd by gate 710 and the bits on pins 5 and 6 of shift register 118 are XOR'd by gate 712. In the second level of XOR function, the outputs of gates 710 and 712 are XOR'd. If the clock input on pin 8 of shift register 118 is 80 kHz, a defect-reduced binary random sequence (BRS) at 20,000 bits per second will be produced at pin 6 of IC8, and if the clock pulse input on pin 8 of shift register 118 is 40 kHz, a defect-reduced BRS at 10,000 bits per second will be produced at pin 6 of IC8.

The binary random sequence output at pin 6 of IC8 is formatted for transfer to the computer 1104 (FIG. 11) in shift register 122, latch 124, and buffer 126. Shift register 122 forms the sequence into 4-bit nibbles, which are latched in latch 124. Buffer 126 isolates the signals on pins 10–13, and 15 of connector J2 from the rest of the circuit 100 and provides the power to drive the capacitance of the parallel connection to computer 1104. As indicated above, every sixteen clock cycle on line 182, an interrupt signal is generated on pin 8 of IC9 (FIG. 6), which signal is buffered in two stages by inverters 720 and 721 and output on the No. 10 pin of connector J2; each time the interrupt signal occurs, a latched signal on the No. 11, 12, 13, and 15 pins is ready for computer 1104.

Preferably, the resistors discussed above are of the following types and values: resistors 334, 337, 340 and 342 are 3.57 kohm, 1% resistors; resistor 335 is a 10 kohm, 1% resistor; resistors 338, 341, 343, 346, 420 and 421 are 20 kohm, 1% resistors; resistor 347 is a 100 kohm, 1% resistor; resistor 300 is a 150 kohm, 1% resistor; resistors 140–143 are 1 megohm, 1% resistors; resistors 329 and 348 are 200 ohm, 5% resistors; resistors 331 and 344 are 1.5 kohm, 5% resistors; resistor 145 is a 3.9 kohm, 5% resistor; resistors 333 and 338 are 510 ohm, 5% resistors; resistors 220, 330 and 332 are 1 kohm, 5% resistors; resistors 144, 423, 424, 520, and 522 are 2 kohm, 5% resistors; resistors 339 and 345 are 100 kohm, 5% resistors; resistors 222 and 521 are 1 megohm, 5% resistors; and resistor 422 is a 5% resistor the value of which is selected so that the fraction of time spent in the "high" state and in the "low" state on analog to binary converter output 175 are essentially equal—preferably, this resistor is in the range 3.6 megohm to 22 megohm; all resistors are preferably 1/4 watt resistors. Preferably, the capacitors discussed above are of the following types and values: capacitor 314 is a 100 picofarad, 2%, silver-mica capacitor; capacitors 131, 132, 213, 510 and 511 are 470 picofarad, 10%, ceramic capacitors; capacitors 317 and 319 are 0.10 microfarad, 10%, ceramic capacitors; capacitor 411 is a 0.22 microfarad, 10% ceramic capacitor; capacitors 210 and 512 are 0.47 microfarad, 20%, tantalum, polarized capacitors; capacitors 133, 134, 211, 212, 310–313, 315, 316, 318, 320, and 412 are 4.7 microfarad, 20%, tantalum, polarized capacitors; and capacitor 410 is a 100 picofarad, 10%, ceramic capacitor.

FIG. 8 shows the physical layout of RNG circuit 100 on printed circuit board (PCB) 800. This figure is not intended to show the details of the circuit precisely, nor is it intended to be in scale, but is only intended to show the general layout so that several features of the invention become clear. In addition to the various circuit components already discussed, the PCB includes traces 801, which are shown in dashed outline to indicate that they are physically on the reverse side of the circuit board from the component side that is uppermost in the figure. The integrated circuits IC1 through IC13 are shown approximately in the positions they are located on PCB 800 so that the relative locations of the various portions of the circuit can be seen. Importantly, the low amplitude 101 of the circuit 100 is separate from the normal amplitude portion 109. On the reverse side, the low amplitude portion is nearly surrounded by a ground plane 802, which is broken only in a small channel 804 through which traces 806 pass to connect to the normal amplitude portion 109 of circuit 100. Four holes 820 are formed in PCB board to pass bolts 910 (FIG. 9). As will be seen below, these features facilitate the shielding of low amplitude portion 101. Connector J2 is located at one end 812 of circuit board 802, which facilitates a simple connection of the circuit 100 to a computer 1104 (FIG. 11). Circuit board 800 and traces 801 are made of conventional materials as is known in the art.

FIG. 9 shows the analog end 814 of PCB 800 with the cover portions of electromagnetic interference (EMI) shield 900 about to be bolted in place. Shield 900 preferably includes a component side cover 902, a solder side cover 904, four bolts 910, four nuts 912, and ground plane 802 (FIG. 8). Preferably, the component side cover 902 is deeper than the solder side cover 904 to provide room for the components. Preferably, component side cover 902 is about 0.30 inches deep and the solder side cover 904 is about 0.090 inches deep. Both covers include a flange 920 and 921 which has four holes 924 formed in it. The holes 924 pass bolts 910. Flanges 920 and 921 also intercept any EMI that could otherwise fringe through the gap 1010 (FIG. 10) between the covers 902 and 904 due to the thickness of circuit board 800. The circuit board 800 is thin, preferably about 0.062 inches thick. Preferably, each of flanges 920 and 921 are about 0.25 inches wide. Covers 902 and 904 are preferably stamped from about 0.025 inch thick steel or other suitable ferromagnetic material. Bolts 910 and nuts 912 are also made of a ferromagnetic material. FIG. 10 shows a cross-section through lines 10—10 in FIG. 9, which passes through the flanges 920 and 921 of covers 902 and 904. As can be seen in this figure, flange 921 includes a dimpled portion 1020 which is offset from the rest of flange 921 in a direction away from the open side 930 of cover 904. Dimpled portion 1020 forms a channel 1022 between the flange 921 and PCB 800 through which traces 801 pass. The offset of dimpled portion 1020 is preferably about 0.015 inches. When covers 902 and 904 are firmly bolted in place about low amplitude portion 101 of circuit 100, both covers 902 and 904 are grounded to ground plane 802. As described above, shield 900 protects the low amplitude portion 101 of circuit 100 from both electrostatic and electromagnetic interference.

FIG. 11 shows a preferred embodiment of a complete random number generator system 1100 according to the invention. It includes an electronic module 1102, a computer 1104 which includes software for interfacing with module 1102, and a connecting cable 1106. Module 1102 includes a housing 1110 and circuit 100 mounted on a circuit board 800, the latter two of which have just been discussed in detail. Housing 1110 includes a box-like housing body 1112, end plates 1114 and 1115, and four bolts 1116. Housing body 1112 is a molded rectangular cylinder having open ends 1118, grooves 1122 within which the side ends 1123 of PCB 800 slide, and threaded bores 1124. Plates 1114 and 1115 are shaped to cover the ends 1118 and 1119 of housing body 1112 and each have two holes 1130 passing bolts 1116. Plate 1114 has an opening 1132 shaped to accept the distal end 1133 of connector 102 including a pair of bolts 1134, each of which includes an enlarged head having a threaded bore 1136. Module 1102 is assembled by attaching plate 1115 to end 1119 of housing body 1112 using bolts, such as 1116, inserting the end 1133 of connector 102 through opening 1132, screwing bolts 1134 into threaded bores (not shown) in connector 102 to attach plate 1114 to the connector 102, slipping PCB 800 into grooves 1122 until plate 1114 is flush against the end 1118 of housing body 1112, inserting bolts 1116 through holes 1130, and screwing them into bores 1124 to close the end 1118 of housing body 1112 and secure the plate 1114 to the housing body. Housing body 1112 and end plates 1114 and 1115 are preferably made of aluminum or other easily moldable material, though any suitable metal or other material may be used.

Connecting cable 1106 includes a wire cable portion 1140 and a pair of connectors, 1142 and 1169, one attached to either end of cable portion 1140. Connector 1142 has a distal engaging portion 1144 with 25 pins (not shown) that fit into female pin receptacles 1145 in connector 102. Connector 1142 also includes threaded rods 1146 which screw into bores 1136 in the heads of bolts 1134 to secure the connector 1142 to mating connector 102. The connectors 102 and 1142 are conventional and their design and operation are well-known to anyone familiar with personal computers, thus they need not be discussed in greater detail. In fact, it is a feature of the invention that RNG module 1102 may be connected to any personal computer 1104 using the standard parallel port connecting cable 1106.

In the preferred embodiment, computer 1104 is a conventional personal computer, such as any IBM compatible PC, but also may be an Apple brand computer, a work station, a mini-computer, a main frame computer, or any other computer capable of interacting with a peripheral. In FIG. 11, computer 1104 is shown with its case 1190 partially cut away to expose internal components. As known in the art, PC 1104 includes parallel port 1150, an input means, which is typically a keyboard 1160, but also may be a modem or other device, an output means, which typically is a display 1162, but also may be a printer, modem, or other device, a memory 1163, which typically includes a RAM 1164, a hard disk 1165, and a floppy disk 1166, a central processing unit (CPU) 1168, and a motherboard 1170 that typically includes a self-contained memory 1620 (FIG. 16) called a bios. In the embodiment shown in FIG. 11, parallel port 1150 provides a power source for the random noise generator circuit 100. As known in the art, ultimately, the power comes from an AC source or a battery (not shown). Since PC's are well-known, there is no need to discuss the details further.

Figure 12A:
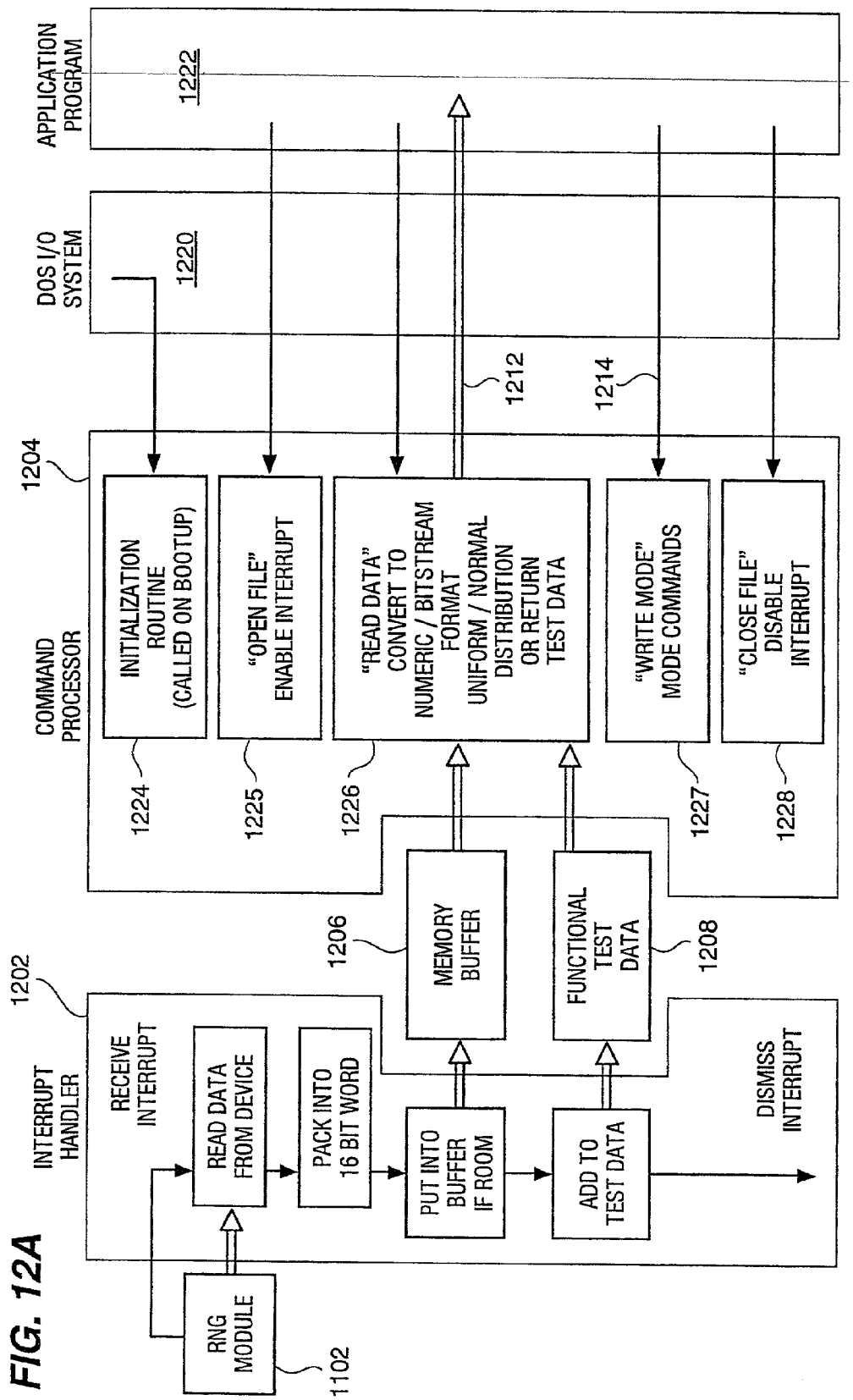
FIG. 12A is a block diagram of the preferred embodiment of the device driver software for operating the RNG circuit of FIG. 1.

Memory 1163 includes software that is designed to interface with RNG module 1102 to operate it, retrieve the sequences of bits generated by it, and to make them available to applications programs. A functional block diagram illustrating an example of such software is shown in FIG. 1A. This illustration is of a device driver, which is a type of software well-known in the computer art. The device driver software 1200 includes two parts: an interrupt handler portion 1202 and a command processor portion 1204. The two portions interact via a memory buffer 1206, which the software 1200 sets up in the computer memory 1163 to store the random sequence of bits produced by RNG module 1102, and another portion 1208 of the memory 1163 in which functional test data is stored. Memory buffer 1206 is preferably set up in RAM 1164. The interrupt handler software also interacts with RNG module 1102, while the command processor software 1204 interacts with the computer I/O system 1220, which generally is part of the operating system of the computer, and one or more applications programs 1222 which provide the interface to the RNG user. In FIG. 12A data flow paths are indicated by double-lined arrows, such as 1212 while program calls are indicated by single-line arrows, such as 1214.

The flow chart for the preferred embodiment of the interrupt handler portion 1202 of the software 1200 is shown at the left in FIG. 12A within the interrupt handler box 1202. As discussed above, when RNG module 1102 has a four-bit word ready for transmission, it provides an interrupt on pin 10 of parallel port 1150. Upon receipt of this interrupt, the interrupt handler software 1202 reads the data from the RNG module, then packs it into a 16 bit word, which is then stored in memory buffer 1206, if the memory buffer is not full. The word is also added to the test data which is stored at a designated location in the memory 1163. The interrupt is then dismissed.

The command processor software 1204 comprises five functions: an initialization routine 1224, an open file enable interrupt function 1225, a read data routine 1226, a write mode function 1227, and a close file disable interrupt function 1228. The details of the initialization routine 1204 are given in FIGS. 12B and 12C, while the details of the other functions are given in FIG. 12D. The initialization routine 1224 is called from the I/O system software 1220 on bootup of the computer 1104. The "open file" enable interrupt is called from the applications program 1222, usually when the applications program is opened, though it may be called only when a random number generator function is activated in the applications program. The read data function 1226 is called from the applications program when the applications program requires a sequence of random numbers or some other form of a random sequence, or when the applications program asks for test data. At that time the read data function 1226 provides a random sequence from memory buffer 1206 in the operating mode format set up with the write mode function 1227 or test data if the applications program is calling for such. The write mode function 1227 receives a call from the applications program when the user opens the set-up function of the applications program. The "close file" function is called from the applications program, usually when the program is exited, but may be called when the random number generator function of the applications program is exited.

Figure 12B:
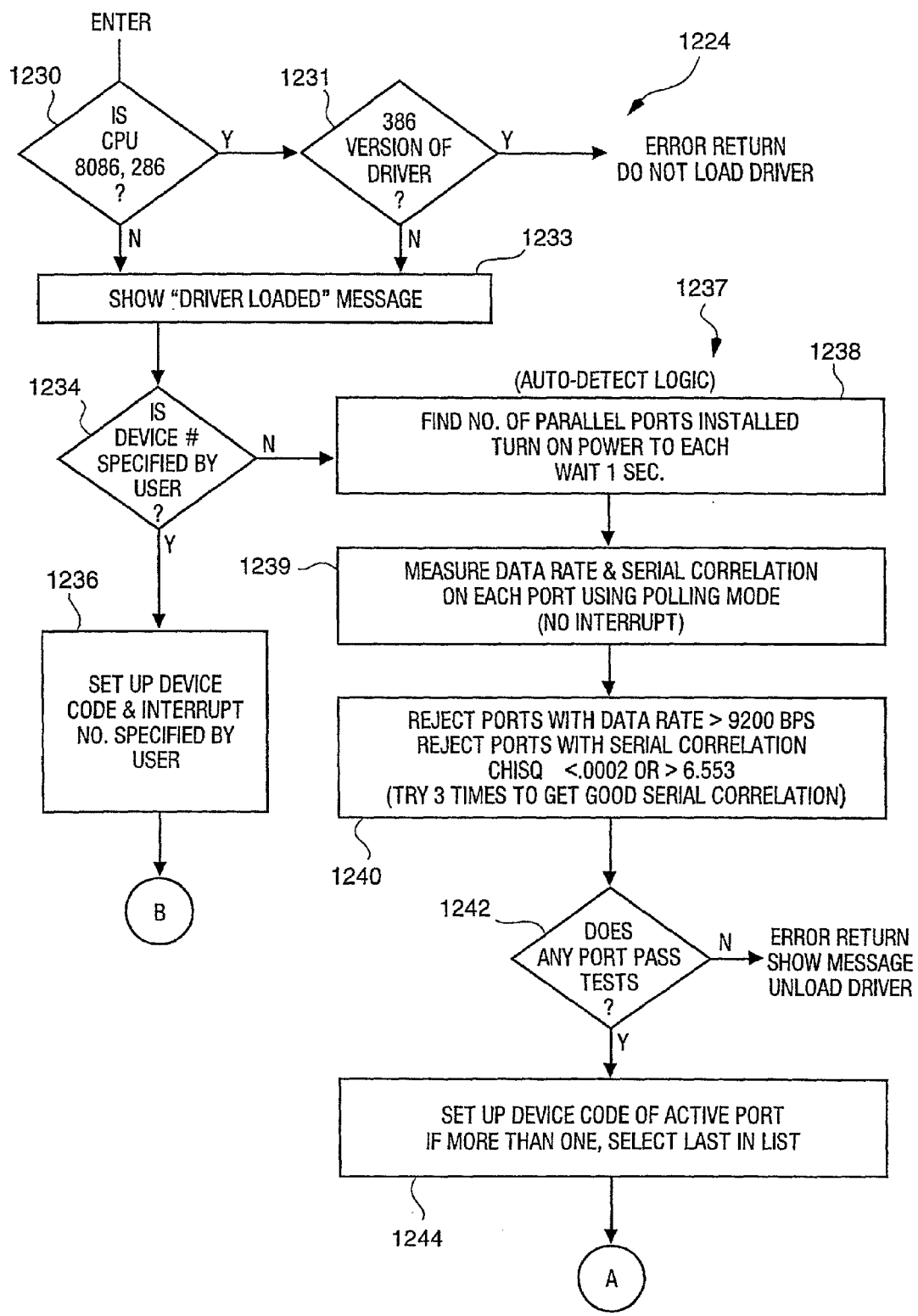
FIGS. 12B and 12C are a flow chart of the initialization routine of the device driver software of FIG. 12A.
Figure 12C:
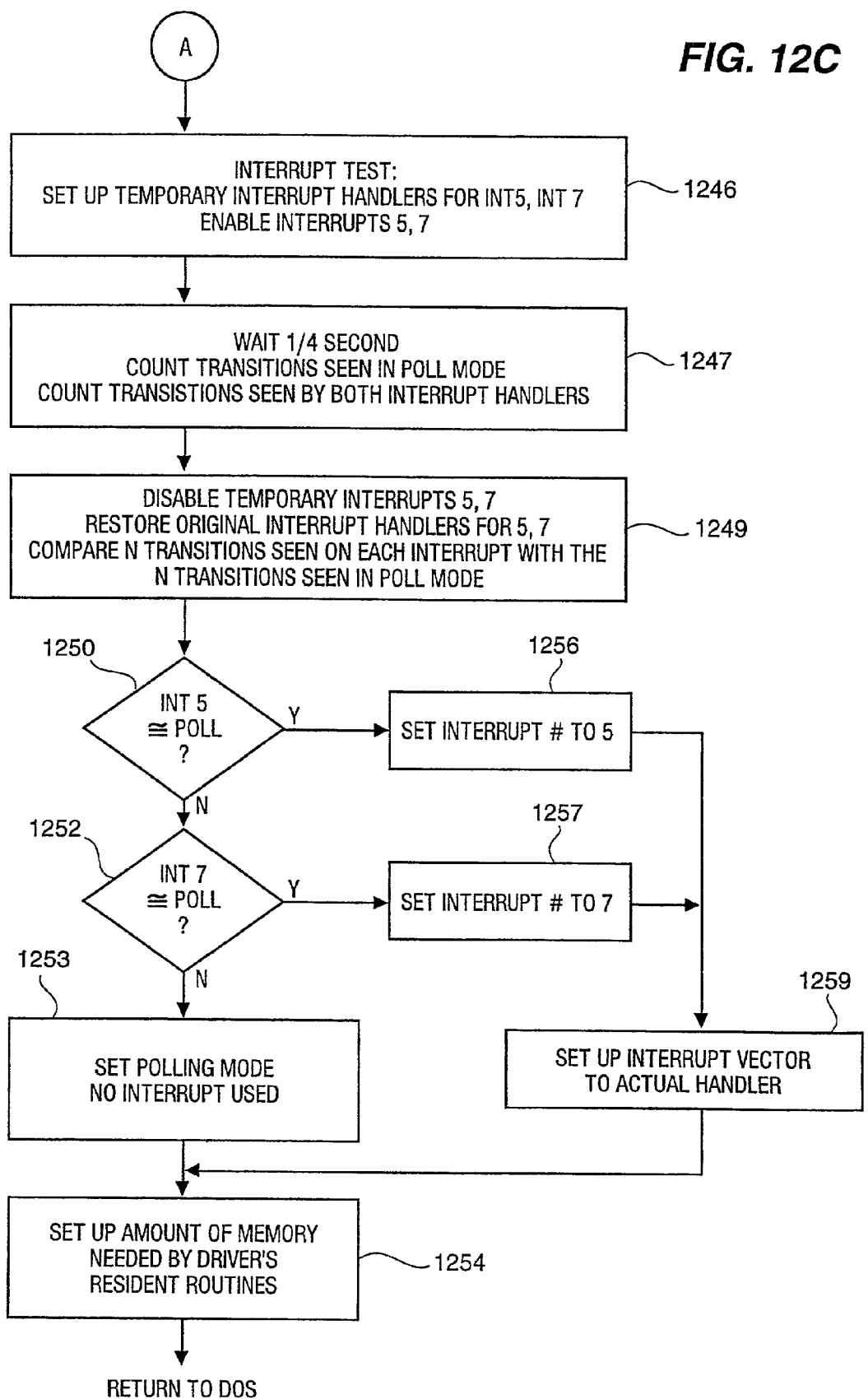

Turning to FIGS. 12B and 12C, a flow chart of the preferred embodiment of the initialization routine 1224 is shown. This embodiment is for an IBM compatible PC. As is normal for device drivers, the initialization routine is entered each time the computer 1104 is booted up. Both a 386/486/Pentium version of the device driver, hereinafter referred to as the "386" version, and an 8086/286 version of the device driver are included on the disk from which the software is installed, and the install program determines the type of CPU and loads the proper device driver. Steps 1230 and 1231 check to make sure that a version of the device driver that the computer can handle is installed. In step 1230 the software interrogates the CPU and checks to see if it is a 8086 or 286 processor, and if not, loads the device driver and shows the "driver loaded" message on the display in step 1233. If the CPU is a 8086 or 286, then there could be a compatibility problem, so the program goes to step 1231 to see if the 386 version of the driver is installed. If it is, the software provides an error return and does not load the driver, since an 8086 or 286 cannot handle the 386 version of the driver. If it is not, then the program completes step 1233 and proceeds to step 1234. In the install program, the user has the option of bypassing the auto detect logic (see below) and direct the driver to utilize a specific port and interrupt number by including this information in a DEVICE command. If the user has chosen this alternative, step 1234 passes the program control to step 1236 in which the port and interrupt number specified by the user are set up. The program control then proceeds to FIG. 12C at the point "B".

If the user has not specified a particular port and interrupt number, an auto-detect routine 1237 is entered. This routine automatically locates the port to which the module 1102 is connected and the interrupt it is using, provided the port is one of the three standard printer ports, i.e. device codes 3BC, 378, or 278, and the interrupt is one of the standard printer interrupts, i.e. INT 5 or INT 7. If no interrupt is detected, the device driver 1200 will operate in polling mode, which is a standard no interrupt mode. In step 1238 the software finds the number of parallel ports installed, turns on the power to each, and waits for 1 second to allow the RNG module 1102 to warm up. Then, in step 1239, the data rate and serial correlation on each port is measured in polling mode. In step 1240, the software then rejects ports with a data rate of less than 9200 bits per second or with a serial correlation, $X^2$, of less than 0.0002 or greater than 6.553. The software does this step three times to try to get good serial correlation. If no port passes these tests, then in step 1242 an error message is displayed and the driver is unloaded. If a port does pass the test, then the device code of the port that passed is set up in step 1244; if more than one port passes then the ports are listed in the order 3BC, 378, and 278, and the last port on the list is used, since the 278 port usually will avoid conflicts best with software systems such as WINDOWS™, and the 378 is next best. The program control then passes to the steps shown in FIG. 12C at point "A".

In step 1246 temporary interrupt handlers for INT 5 and INT 7 are set up and the interrupts are enabled. The temporary interrupt handlers are designed to properly count the transitions so that the following test works. The program pauses for a quarter second in step 1247 and then counts the transitions seen in poll mode and the transitions seen by the temporary INT 5 handler and the temporary INT 7 handler. Then, in step 1249, the temporary interrupt handlers are disabled and the normal interrupt handlers for INT 5 and INT 7 are restored. At the same time the number of transitions seen on each of the temporary interrupts are compared to the number of transitions seen in poll mode. If the number of transitions seen by the temporary INT 5 handler is within ±20 counts of the number of transitions seen in poll mode, the program control goes to the right at decision tree 1250 and the interrupt number is set to 5 in step 1256. If the number of transitions seen by the temporary INT 5 handler is not within ±20 counts of the number of transitions seen in poll mode, the program control goes down in step 1250. In step 1252, if the number of transitions seen by the temporary INT 7 handler is within ±20 counts of the number of transitions seen in poll mode, the program control goes to the right and the interrupt number is set to 7 in step 1256. If the number of transitions seen by the temporary INT 7 handler is not within ±20 counts of the number of transitions seen in poll mode, the program control goes down to step 1253 where the mode is set to polling mode, with no interrupts used. From steps 1256 and 1257, or if the device code was set by the user (FIG. 12B), then, in step 1259, the interrupt vector is set to the handler actually used. From both steps 1253 and 1259, the program proceeds to set up the amount of memory needed by the selected driver's resident routines, including setting up the memory buffer 1206, and the program control then returns to the disk operating system (DOS).

Figure 12D:
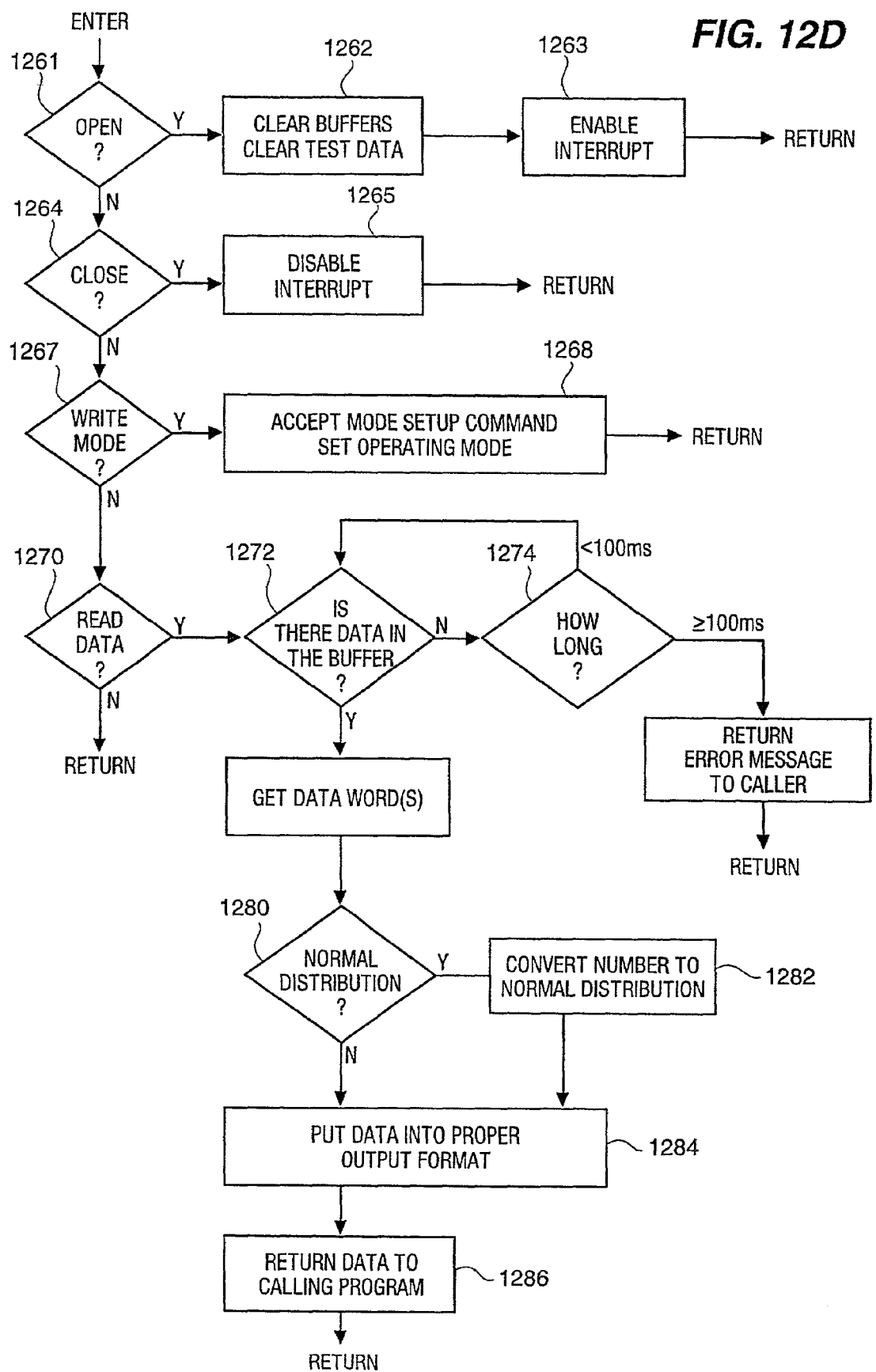
FIG. 12D is a flow chart of the open file, read data, write mode commands, and close file functions of the device driver of FIG. 12A.

A flow chart of the preferred routine 1260 for performing the open file, read data, write mode, and close file functions, i.e. functions 1225–1228 in FIG. 12A, is shown in FIG. 12D. In step 1261 the routine checks to see if an open file call is being placed by the applications program 1222, and if so, it proceeds to step 1262 where it clears the memory buffer 1206 and test data buffer 1208, then to step 1263 where it enables the interrupt and then program control returns to where it left the operating system or applications program. If no open file call is being made, then the program control passes to step 1264, where the routine checks to see if a close file call is being made by the applications program 1222. If so, the program control goes to step 1265 where it disables the interrupt then returns to the operating or applications program.

If no close file call is being made from the applications program 1222, then the program control passes through to step 1267 where the routine 1260 checks to see if a write mode call has been made from the applications program 1222. If so, the routine goes to step 1268 where it accepts a mode setup command from the applications program and sets the operating mode. Modes available by use of a mode operating command are: uniform 16-bit mode, uniform 32-bit mode, normal-signed mode, normal-unsigned mode, basic hex mode, and validity check mode. The uniform 16-bit mode provides uniformly distributed floating point numbers between 0 and +1; 1.0 is not included in this range. Each number is a six-digit number preceded by a decimal point and followed by a newline character. Not all 6 digits are significant because the values are derived from 16-bit integers. Uniform 32-bit mode is the same as uniform 16-bit mode except the numbers are derived from 32-bit integers and nine digits are returned for each value. Normal-signed mode returns normally distributed values based on 32-bit integers. The range is arbitrarily limited to +8.0 standard deviations, though this limit would not be reached in normal use. Each value is followed by a newline character. The normal-unsigned mode is the same as normal-signed except the values are normally distributed between 0 and +8.0. Basic hex mode returns a stream of ASCII hex digits, each representing a 4-bit random integer. No decimal points or newline characters are appended. Validity check mode runs a basic validity check on the bit stream received from the RNG module 1102. Each time this command is called, the device driver 1200 returns to the applications program 1222 a line of text containing: the bit count, i.e. the number of bits received since the last call; the number of excess 1's; and the first order serial correlation in parts per million. The default mode is signed normal mode. The device driver will normally reset to the default mode each time it is opened, i.e. each time the computer is turned on. However, an additional "hard" mode setup command overrides this reset function and prevents resetting of the mode to the default mode when the device driver is opened. If this hard mode command is called, the device driver opens in the last requested operating mode each time the computer is turned on.

After the operating mode is set, the program returns to the applications program or operating system. If no write mode call is being made, the routine 1260 goes to step 1270 in which it checks to see if a read data call is being made. If no call for data is being made, the program control returns to the applications program or operating system. If a read data call is being made, the routine 1260 checks in step 1272 to see if there is data in the memory buffer 1206, and if there isn't cycles through step 1274 back to step 1272 for a tenth of a second. If there is still no data in buffer 1206, an error message is returned to the calling program, and program control returns to the applications program or operating system. If there is data in buffer 1206, the routine 1260 gets the data word or words. The applications program may request a single word at a time or a specified number of words. The routine then proceeds to step 1280 where it checks to see if the mode set in step 1268 requires a normal distribution. If so, it proceeds to step 1282 where the data number is converted to normal distribution. After conversion, or if no normal distribution is required, the routine goes to step 1284 where the data is arranged in the output format as specified above. The data is then returned to the calling program in step 1286, and the program control returns to the operating system 1220 or applications program 1222. If the applications program 1222 requests data at a rate lower than the rate at which the RNG module 1102 provides the data, i.e. at a rate lower than the 10,000 bits per second or 20,000 bits per second selectable with connector/jumper 128, the extra samples are discarded. If the applications program 1222 requests data at a higher rate, the driver will cause the applications program to wait until the data becomes available.

As can be seen from the above, the applications program 1222 communicates with the RNG module 1102 via the device driver. The device driver software 1200 is preferably part of the operating system of the computer and is typically stored on the hard disk 1165. As indicated above, the device driver software is initiated along with the operating system each time the computer 1104 is turned on. Thus, once the module 1102 is connected to the parallel port and the device driver is installed, the RNG system 1100 for the most part operates transparently.

The above-described interface software 1200 illustrates but one of many device driver interfaces that may be devised. For example, one skilled in the art will recognize that the device driver can be designed to offer options of returning the random sequence in other modes than those discussed above. As known in the art, an almost limitless number of different distributions can be devised. The application program to which the binary random sequence is sent may use the sequence in many ways. It can use the bits directly as provided or convert it to another form not provided by the device driver.

The use of a device driver as the interface is a feature of the invention. It permits the RNG module 1102 to be tested automatically each time the computer 1104 is turned on, and allows the applications to be set up in a format computer users are familiar with, such as pop-up menus, icons, mice, etc. Many other interfaces with the circuit 100 are possible. For example, the interface may be incorporated into an application program, a program intermediate between operating system programs and applications, such as Windows TM, a program placed in a bios 1620 on a memory board 1600 (FIG. 16), wired into firmware, or designed in any other way that computer peripherals may be interfaced with. Interfaces other than a device driver may also be used. For example, the interface may be in a terminate-and-stay-resident program, commonly called a TSR, or may be in some portion of the operating system other than a device driver.

The software that is provided with the RNG system 1100 also includes a test program that tests the following properties of the system: the data rate; which interrupts are in use, if any; whether the module 1102 is activating more than 1 interrupt; whether the interrupt occurs on the rising or falling edge of the clock, which affects the amount of time available to process an interrupt; the one/zero balance of the output data; the bit serial correlation of the output data, providing first order through the eight order results; "monkey" tests; and entropy tests. The test program also provides a graphic display of the number distribution.

It is a feature of the invention that the RNG module 1102 connects directly to the parallel port 1150 of a computer 1104. No separate power supply and associated power cord is required. This greatly simplifies the installation and use of the module 1102. Once installed, the hardware becomes transparent, and the user is aware of it only through the interface software. However, other ways of incorporating the hardware into a computer system may be used. Two alternative embodiments are shown in FIGS. 15 and 16. In FIG. 15, the RNG circuit 1510 is mounted on an add-on board 1502 that installs in case 1190 of computer 1104. As known in the PC art, in this embodiment, connector 1510 replaces connector J2 of the embodiment of FIG. 1 and plugs directly into the bus of the computer 1104. In this embodiment, the power source for RNG circuit 1510 comprises certain ones of pins 1520 that connect to the power bus. The circuit 1510 may be the same as the circuit of the embodiment of FIG. 1, except since the power supply will usually come directly from the computer power supply through pins 1520, the low power components may be replaced by equivalent components that use more power, and the digital circuits that directly interface with the bus will be designed to transfer words of 16, 32 or more bits in length, as is well-known to one skilled in the computer art. Circuit 1510 also contains an analog portion 1501 and a digital portion 1509, and, the analog portion is shielded with shield 1530. In the embodiment of FIG. 16, the RNG circuit 1610 is mounted on the motherboard 1600 of a PC. The circuit 1610 is equivalent to the circuit 1510 of the previous embodiment, including an analog portion 1601 protected by shield 1630, and a digital portion 1609. However, in this embodiment, digital portion 1609 is fabricated on a single integrated circuit chip 1609, and the power source of the RNG circuit 1610 comprises the motherboard power source, i.e. power connectors, such as 1630, which connect to a regulated DC power source (not shown) as known in the art.

FIG. 17 shows a partially block diagram of an alternative preferred embodiment of an RNG circuit 1700 that can replace a portion of either circuit 100 in the embodiment of FIG. 1, circuit 1510 of the embodiment of FIG. 15, or circuit 1610 of the embodiment of FIG. 16. RNG circuit 1700 includes a source 1702 of intrinsically random pulses caused by quantum events, a signal conditioner 1704, and a randomness defect reducer 1706. In the preferred embodiment the intrinsically random quantum source 1702 comprises a nuclear source 1703 and a nuclear decay detector 1708 that is adjacent to nuclear source 1703. However, it also could be any other intrinsically random quantum source, such as a quantum noise in a stream of photons. Nuclear source 1703 preferably is similar to the americium source used in smoke detectors. Since the output of quantum source 1702 is a pulse, an analog to binary converter is not necessary in this embodiment. Signal conditioner 1704 transforms the pulse 1720 output by source 1702 to a signal that is of essentially the same voltage as the signal on output 175 of analog to binary converter of the embodiment of FIG. 1. In the RNG circuit 1700, a different randomness defect reducer 1706 is used. In this embodiment, randomness defect reducer 1706 preferably comprises a 74HC74 divider 1710 available from Harris Semiconductor. As in the embodiment of FIG. 1, the signal at line 1775 is adjusted by capacitor 1731 and resistors 1740 and 1741. Line 1775 is connected to node 1776 through capacitor 1731. Node 1776 is connected to ground through resistor 1740, to power source line 1768, which is equivalent to line 168 in FIG. 1, through resistor 1741, and to pin 3 of divider 1710, which is the data input to divider 1710. Power source line 1768 is also connected to pins 1, 4, and 10–14 of divider 1710. Pin 7 of divider 1710 is grounded and pins 6 and 2 are connected. Preferably, capacitor 1731 and resistors 1740 and 1741 have the same values as capacitor 131 and resistors 140 and 141, respectively, of the embodiment of FIG. 1.

In the above configuration, the 74HC74 chip becomes a divide by 2 divider. The output may be provided to pin 1 of a shift register such as IC11 in FIG. 7, and the rest of the circuit 1700 is then the same as the rest of circuit 100 shown in FIGS. 1 and 7. The use of a divider as a randomness defect reducer is particularly effective in combination with random signal sources that derive from discrete random events, such as nuclear decay, since such a divider reduces the one/zero bias, which is the principal source of randomness defects in such discrete event sources. However, it also may be used with sources such as the white noise resistor 300 of the embodiment of FIG. 1. In this case the divider is configured to switch on positive transitions.

A key factor in the development of the invention, was the discovery of the ability to predict the randomness quality of the RNG system 1100. How this is done may perhaps be understood best by starting with fundamental principals of statistics related to binary random sequences (BRS). A BRS can be described statistically by two fundamental properties: 1) SD(t), the serial dependence as a function of delay time, that is, the dependence of the value for a binary pulse on the values of the binary pulses adjacent to it in a serial sequence as a function of the time between pulses; and 2) p(x), where x=0 or 1, the average probability of a "0" or "1" occurring in the BRS.

A truly random sequence is defined by $SD(t)=0$ for all t and $p(1)=0.50$ as $N \to \infty$, where N=the number of bits. In practical terms, N cannot be infinite so, a real BRS is instead defined in terms of probability confidence levels. Every real system used to generate random numbers has physical constraints which create imperfections which, without correction, produce an unacceptable level of defect in the BRS statistics. The primary defects can be accounted for as defects in the SD(t) and in a derived measure related to p(1) and given in equation (3) above, i.e.:

$$B_2 = [N(1) - 0.5N]/0.5N \quad (3)$$

where $N(1)$ is the number of 1's in a binary random sequence of length N. $B_2$ is a fractional expression of the excess 1's in the sequence. $B_2$ varies between $-1$ for a BRS of all 0's and $+1$ for a BRS of all 1's, with $B_2=0$ being the same condition as $p(1)=0.5$.

It was recognized that if the defects in a real system could be reduced in a predictable manner so as to produce a BRS having statistics suitable for any particular application, then optimum RNG's could be developed, which had acceptable levels of defects for the application, and which were as fast as possible for the application. It is also important to be able to predict the BRS statistics from quickly measurable parameters to avoid the years of verification testing that would otherwise be necessary. It was further recognized that defects could be reduced by using one or more levels of XOR operations, where, in each level, non-overlapping pairs of consecutive bits in the BRS are taken as the inputs of the XOR to produce a single output bit in a new sequence, BRS*, having half the bit rate as the original sequence. The new sequence may be treated in the same way to produce a further sequence, BRS**, at one-fourth the bit rate as the original rate. The output statistics from each level of XOR operation are related to the statistics of the input sequence by the equations:

$$B_2^* = -SD(1) \quad (1)$$

and $$SD(1)^* \leq SD(1)^2 + SD(2)^2, \; SD(2)^* \leq SD(1)^2 + SD(4)^2, \ldots$$

where the star, *, indicates the statistic at the output of each level of XOR error correction while the unstarred values are those at the input of the error correction level, SD(t) is the serial dependence as a function time, SD(1) indicates the first order serial dependence, that is, the serial dependence at the first sample period, SD(2) the second order serial dependence, etc. Equations (1) and (2) are applicable for small $B_2$ and SD(t), i.e. $B_2 SD(t) < 0.01$. As both $B_2$ and SD(t) near their maxima, more complex equations apply.

Another point in these design equations is that the square of $B_2$ for the original BRS, i.e. $B_2^2$, is a component of SD(t). If SD(t)' is the serial dependence with $B_2=0$, then $$SD(t) = SD(t)' + B_2^2 \quad (4)$$

From the above it is seen that $B_2^2$ must be kept low, or at least less than or equal to SD(t)'.

Using equations (1) and (2) and measured values of SD(t) for a real system, one may calculate the final output statistics for a two-level XOR defect reducer. For the embodiment of the invention shown in FIG. 1 and described in connection with FIGS. 2–11, $|B_2| \leq 0.002$ and $|SD(t)| \leq 0.0004$ if $t \geq SP$, where SP=one sample period, i.e. 12.5 microseconds for the embodiment described. For this embodiment, $B_2$ is suitably small, since $|B_2^2| \leq 0.000004$, and thus it contributes only about 1% of SD(t). Putting these values into equations (1) and (2), one obtains: At 1st level XOR output 711 or 713: $B_2^* \leq 0.0004$; $SD(t \geq 25 \text{ microseconds})^* \leq 3.2 \times 10^{-7}$. At the second level output 715, $|B^{}| \leq 3.2 \times 10^{-7}$, $SD(t \geq 50 \text{ microseconds})^{} \leq 2.05 \times 10^{-13}$. At 20,000 bits per second, it would take, on the average, about 50 years for a defect to show up in the 1/0 balance with a 95% confidence level, while a defect in SD(t) could never be detected.

Figure 14:
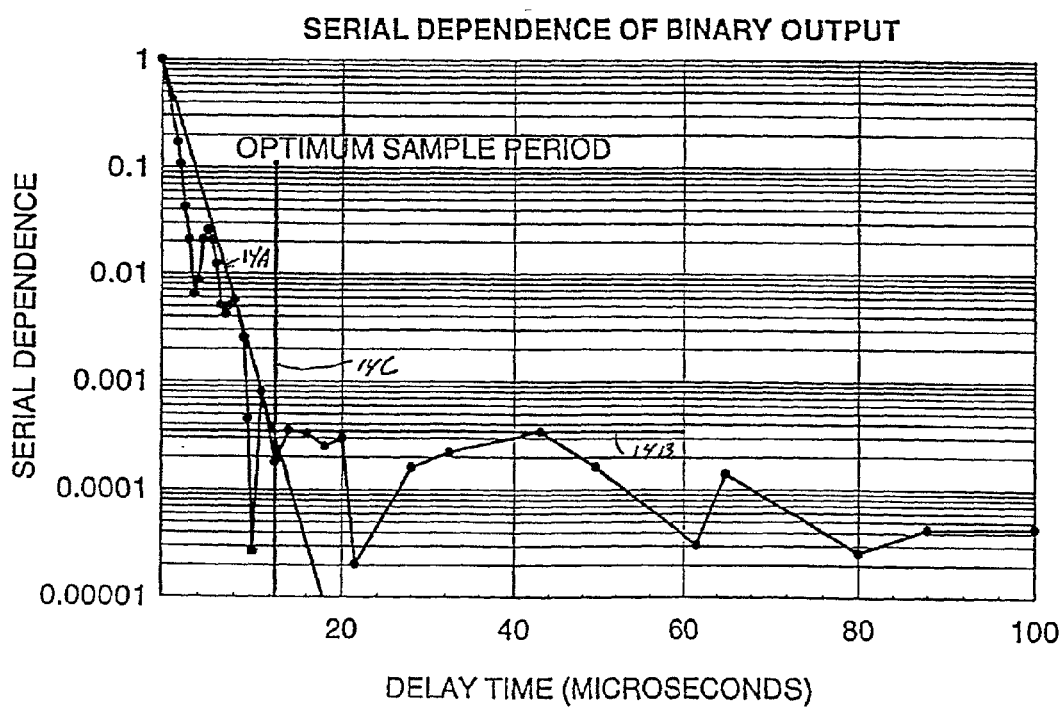
FIG. 14 is a graph of the serial dependance of the binary output of the RNG of FIG. 1 versus delay time.
Figure 18:
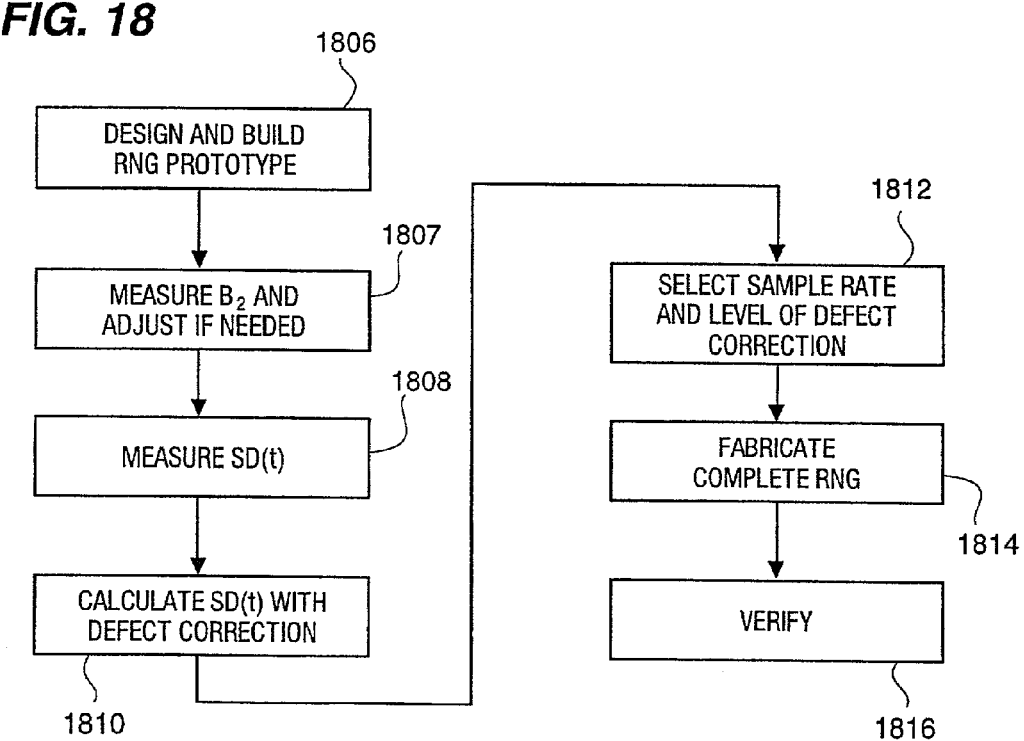
FIG. 18 is a flow chart showing a process of making an RNG according to the invention.

The above discussion leads to the process for making an RNG shown in FIG. 18. In step 1806 a prototype RNG is designed and built. This prototype need only include the portions of the circuit up to the output which produces the binary pulse, such as up to node 176 in FIG. 1, though the whole circuit may be built to be sure that any interactions between parts are accounted for. In step 1807, $B_2$ is measured on the prototype at node 176 or other output of interest and is easily reduced below 0.005 by trimming. In step 1808, SD(t) is then measured at analog to binary output 176 at several sample rates, as shown in FIG. 14, for example. Then, using the measured values of SD(t) and equations (1) and (2), in step 1810, the predicted SD(t) is calculated for one or more levels of defect correction, and preferably also as a function of delay time or sample rate, or at least for several different sample rates. Then, in step 1812, the results are analyzed and a sample rate and level of defect correction, or just one of the foregoing in a simplified process, are selected. In step 1814, the complete random noise generator is fabricated with the selected sample rate and level of defect correction. Finally, in step 1816, the measurements in step 1808 are repeated to verify the integrity of the process.

The above process was used to fabricate the RNG system 1100. As suggested above, variations of this process are at once evident. Indicators of the amount of defects in a system may be used other than SD(t) and $B_2$. As suggested above, statistics may be used to derive such other indicators. Or one of the parameters, such as the sample rate or the level of defect correction, may be fixed at a value that is known to be desirable in the RNG to be fabricated, and the process may then be simplified since not as many parameters need to be measured and calculated.

A feature of the invention is that it provides a random number generator that produces a random sequence of bits in which the defects in randomness are so small that they cannot be detected with a 95% confidence level over trillions of years of continuous testing, a time period that is longer than the presently believed age of the universe.

Another feature that permits the low randomness defects is that 8 separate power sources are used, i.e. pins 2 through 9 of the parallel port 1150, and each power source is separately filtered; for example, the filtering of the power from pin 5 of connector J2 is via resistor 220 and capacitor 210 in FIG. 2, while the filtering of the power from pin 4 of connector J2 is via resistor 344 and capacitor 318 in FIG. 3. This prevents correlations between different parts of the circuit from occurring.

A further feature of the invention is that it provides a high-quality random number generator that runs on very low power. The circuit 100 uses voltages of between 2.7 and 5 volts, draws less than a milliamp from each of the eight parallel port 1150 pins which supply the power, and draws a total power of about 12 milliwatts. A key factor in this is the use of only 74HC series logic chips, which are high-speed, low-power, CMOS integrated circuits. A related feature is that the power required by RNG circuit 100 is so low that It can be provided by the data lines 2–9 of the parallel port 1150 of a computer 1104. A further related feature is that the negative voltage for the low amplitude portion 101 of the RNG circuit is provided by a charge pump.

Another feature of the invention is that, even with such low power, the amplifier 380 according to the invention has low internal noise and a wide band width. One factor that contributes to this is the use of a high-impedance FET input which reduces the chance of randomness-defects-producing interference from external sources. The noise of the amplifier in analog noise generator represents only about 25% of the total amplified noise. The use of either the TL06X series operational amplifiers, where X=0, 1, 2, or 4, the National Semiconductor LF44Y op amps, where Y is 1, 2, or 4, or the Burr-Brown AD548 and AD648 single and dual op amps is an important factor in this feature.

Another feature of the invention is the high speed at low power of the comparator 440 in analog to binary converter 110. The comparator 440, as configured herein, is a high-speed CMOS amplifier that is capable of producing a logic transition in 10 nanoseconds, or only 20 nanoseconds to complete a cycle. This maintains the high band-width necessary to reduce randomness defects. It also is an important contributor to a related feature, i.e. that the RNG produces a sequence of high-quality random bits at high speed.

A further feature of the invention is that the RNG module 1102 and the software to operate it are relatively inexpensive. Prior art RNG's of comparable quality are hundreds of times more expensive.

There has been described a novel random number generator which is inexpensive, is interfaced directly with a personal computer, and which has many other advantages. It is evident that, now that the invention has been fully disclosed, those skilled in the art may now make numerous uses and modifications of the specific embodiment described, without departing from the inventive concepts. For example, now that it is seen that an inexpensive random number generator may be made by judicious selection of electronic components combined with frequency compensation, selection of the optimum sampling frequency, and randomness defect correction, one or more of these factors may be eliminated by increasing the contribution of one of the other factors, such as another level of defect correction, or by willingness to accept somewhat more defectiveness. The invention may be interfaced with any computer, not just a personal computer, and may be interfaced with the computer using a terminate-and-stay-resident (TSR) program or a portion of the operating system, other than the device driver described. Other true random signal sources may be used. Or equivalent components or circuits can be substituted for the various components and circuits described. Additional features may be added. A greater or lesser number of parts may be used. Consequently, the invention is to be construed as embracing each and every novel feature and novel combination of features present in and/or possessed by the random number generator described.

What is claimed is:

1. A method of producing and utilizing a true random number, said method comprising:
   providing an analog random signal;
   providing a clock signal;

using said analog random signal and said clock signal to produce a binary true random sequence of signals;

interfacing said binary true random sequence of signals to a general-purpose computer; and utilizing said binary true random sequence of signals in said general-purpose computer.

2. A method as in claim 1 wherein said step of providing an analog random signal comprises a step of providing a source of noise selected from the group consisting of thermal noise, amplifier noise, and quantum noise.

3. A method as in claim 1 and further including the step of reducing randomness defects in said true random sequence of binary signals.

4. A method as in claim 1 and further including the step of amplifying said analog random signal prior to set step of using.

5. A method as in claim 1 wherein said interfacing said binary true random sequence of signals to a general-purpose computer comprises:

utilizing an interface selected from the group consisting of a device driver, a portion of the operating system of said general-purpose computer, a portion of a Windows® operating system, a program stored in the bios memory of said general-purpose computer, a program in firmware, and a TSR program.

6. A method as in claim 1 wherein said general-purpose computer comprises a personal computer.

7. A method as in claim 1 and further including:

providing power from said general-purpose computer to a random number generator circuit.

8. A true random number generator system comprising:
a source of analog random signals;
a source of a clock signal;
a sampler for producing a binary true random sequence of signals from said analog random signals and said clock signal;
a general-purpose computer for utilizing said binary true random sequence of signals; and
an interface for applying said binary true random sequence of signals to said general-purpose computer.

9. A true random number generator system as in claim 8 wherein said source of analog random signals comprises a source of noise selected from the group consisting of thermal noise, amplifier noise, and quantum noise.

10. A true random number generator system as in claim 8 and further including a randomness corrector for reducing randomness defects in said binary true random sequence of signals.

11. A true random number generator system as in claim 10 wherein said randomness corrector comprises a system for performing an EXCLUSIVE OR function.

12. A true random number generator system as in claim 8 wherein said interface comprises an interface selected from the group consisting of a device driver, a portion of the operating system of said general-purpose computer, a portion of a Windows® operating system, a program stored in the bios memory of said general-purpose computer, a program in firmware, and a TSR program.

13. A true random number generator system as in claim 8 wherein said general-purpose computer comprises a personal computer.

14. A true random number generator system as in claim 8:
wherein a random number generator circuit includes said source of analog random signals, said source of a clock signal, and said sampler; and
said true random number generator system further comprises:

a power connection operable to provide power from said general-purpose computer to said random number generator circuit.

15. A true random number generator system as in claim 8 wherein:
a random number generator circuit includes said source of analog random signals, said source of a clock signal, and said sampler; and
said random number generator circuit is located in said system at a location selected from the group consisting of the mother board of said general-purpose computer, an add-on board installed in said general-purpose computer, a separate module, and a peripheral of said general-purpose computer.

16. A true random number generator system comprising:
a hardware device for producing a binary true random sequence of signals;
a randomness corrector for reducing randomness defects in said binary true random sequence of signals;
a general-purpose computer for utilizing said binary true random sequence of signals; and
an interface for applying said binary true random sequence of signals to said general-purpose computer.

17. A true random number generator system as in claim 16 wherein said randomness corrector comprises a system for performing an EXCLUSIVE OR function.

18. A true random number generator system as in claim 16 wherein said interface comprises an interface selected from the group consisting of a device driver, a portion of the operating system of said general-purpose computer, a portion of a Windows® operating system, a program stored in the bios memory of said general-purpose computer, a program in firmware, and a TSR program.

19. A true random number generator system as in claim 16 wherein said general-purpose computer comprises a personal computer.

20. A true random number generator system as in claim 16:
wherein a random number generator circuit includes said source of analog random signals, said source of a clock signal, and said sampler; and
said true random number generator system further comprises: a power connection operable to provide power from said general-purpose computer to said random number generator circuit.

21. A true random number generator system as in claim 16 wherein:
a random number generator circuit includes said source of analog random signals, said source of a clock signal, and said sampler; and
said random number generator circuit is located in said system at a location selected from the group consisting of the mother board of said general-purpose computer, an add-on board installed in said general-purpose computer, a separate module, and a peripheral of said general-purpose computer.

22. A true random number generator system comprising:
a hardware device for producing a binary true random sequence of signals; and
a computer for utilizing said binary true random sequence of signals;
wherein $|B_2| \leq 0.002$ and $|SD(t)| 0.0004$, where $|B_2|$ is the fractional bias in the 1, 0 probability of said binary true random sequence of signals and SD(t) is the serial dependence as a function time of said binary true random sequence of signals.

23. A true random number generator system as in claim 22 wherein: $|B_2| \leq 0.0004$ and $SD(t) \leq 3.2 \times 10^{-7}$.

24. A true random number generator system as in claim 22 wherein: $|B_2| 3.2 \leq 10^{-7}$ and $|SD(t)| \leq 2.05 \leq 10^{-13}$.

25. A method of producing a series of high-quality true random numbers, said method comprising the steps of:
  producing a binary true random sequence of signals in which $|B_2| \leq 0.002$ and $|SD(t)| 0.0004$, where $B_2$ is the fractional bias in the 1, 0 probability of said binary true random sequence of signals and $SD(t)$ is the serial dependence as a function time of said binary true random sequence of signals;
  interfacing said binary true random sequence of signals to a computer; and
  utilizing said binary true random sequence of signals in said computer.

* * * * *

UNITED STATES PATENT AND TRADEMARK OFFICE
CERTIFICATE OF CORRECTION

PATENT NO. : 7,096,242 B2  Page 1 of 1
APPLICATION NO. : 10/173520
DATED : August 22, 2006
INVENTOR(S) : Scott A. Wilber It is certified that error appears in the above-identified patent and that said Letters Patent is hereby corrected as shown below:

Column 30
Line 63, " | SD(t) | 0.0004" should read -- | SD(t) | $\leq$ 0.0004 --
Line 63, " | $B_2$ | is" should read -- | $B_2$ | is --

Column 31
Line 2, "SD(t) $\leq$ 3.2 x $10^{-7}$" should read -- | SD(t) | $\leq$ 3.2 x $10^{-7}$ --
Line 4, " | $B_2$ | 3.2$\leq 10^{-7}$" should read -- | $B_2$ | $\leq$ 3.2 x $10^{-7}$ --
Line 4, " | SD(t) | $\leq$ 2.05 $\leq 10^{-13}$" should read -- | SD(t) | $\leq$ 2.05 x $10^{-13}$ --
Line 8, " | SD(t) | 0.0004" should read -- | SD(t) | $\leq$ 0.0004 --

Signed and Sealed this

Ninth Day of October, 2007

JON W. DUDAS
*Director of the United States Patent and Trademark Office*

(12) INTER PARTES REEXAMINATION CERTIFICATE (540th)
United States Patent
Wilber

(10) Number: US 7,096,242 C1
(45) Certificate Issued: Feb. 22, 2013

(54) RANDOM NUMBER GENERATOR AND GENERATION METHOD

(75) Inventor: Scott A. Wilber, Boulder, CO (US)

(73) Assignee: Quantum World Corporation, Roswell, NM (US)

Reexamination Request:
No. 95/000,351, Feb. 21, 2008

Reexamination Certificate for:
Patent No.: 7,096,242
Issued: Aug. 22, 2006
Appl. No.: 10/173,520
Filed: Jun. 17, 2002

Certificate of Correction issued Oct. 9, 2007.

Related U.S. Application Data

(62) Division of application No. 09/699,523, filed on Oct. 30, 2000, now Pat. No. 6,763,364, which is a division of application No. 08/388,631, filed on Feb. 14, 1995, now Pat. No. 6,324,558.

(51) Int. Cl.
*G06F 7/58* (2006.01)

(52) U.S. Cl. .................................................. 708/255

(58) Field of Classification Search ..................... None
See application file for complete search history.

(56) References Cited

To view the complete listing of prior art documents cited during the proceeding for Reexamination Control Number 95/000,351, please refer to the USPTO's public Patent Application Information Retrieval (PAIR) system under the Display References tab.

*Primary Examiner* — Anjan Deb

(57) ABSTRACT

An RNG circuit is connected to the parallel port of a computer. The circuit includes a flat source of white noise and a CMOS amplifier circuit compensated in the high frequency range. A low-frequency cut-off is selected to maintain high band-width yet eliminate the l/f amplifier noise tail. A CMOS comparator with a 10 nanosecond rise time converts the analog signal to a binary one. A shift register converts the serial signal to a 4-bit parallel one at a sample rate selected at the knee of the serial dependence curve. Two levels of XOR defect correction produce a BRS at 20 kHZ, which is converted to a 4-bit parallel word, latched and buffered. The entire circuit is powered from the data pins of the parallel port. A device driver interface in the computer operates the RNG. The randomness defects with various levels of correction and sample rates are calculated and the RNG is optimized before manufacture.

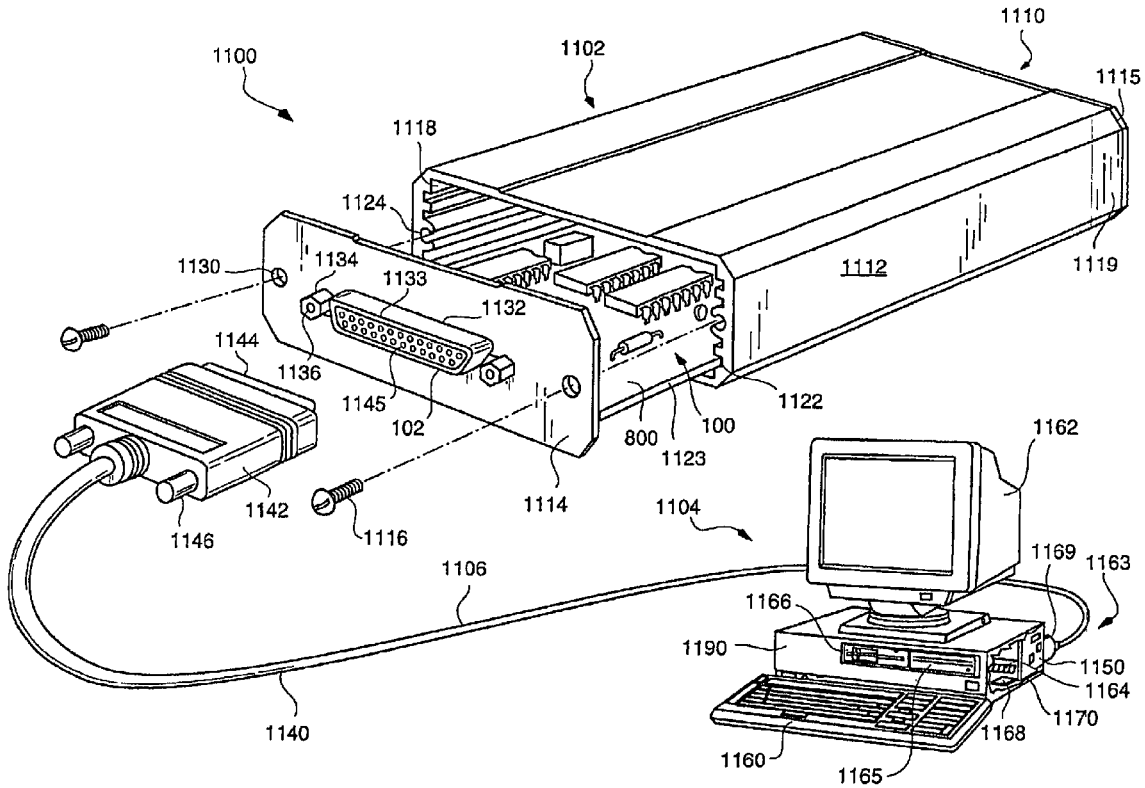

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 22-25 is confirmed.

Claims 1-21 are cancelled.

\* \* \* \* \*